(12) United States Patent
Polyzopoulos et al.

(10) Patent No.: US 10,982,853 B2
(45) Date of Patent: Apr. 20, 2021

(54) W501D5/D5A DF42 COMBUSTION SYSTEM

(71) Applicant: Siemens Energy, Inc., Orlando, FL (US)

(72) Inventors: Charalambos Polyzopoulos, Orlando, FL (US); Richard L. Thackway, Oviedo, FL (US); Stephen A. Ramier, Fredericton (CA); Vinayak V. Barve, Cumming, GA (US); Khalil Farid Abou-Jaoude, Winter Springs, FL (US); Daniel W. Garan, Chuluota, FL (US); David P. Holzapfel, Charlotte, NC (US); Kevin J. Spence, Jupiter, FL (US); Joseph Scott Markovitz, Sanford, FL (US); Blake R. Cotten, Orlando, FL (US); Urmi B. Dave, Oviedo, FL (US); Vaidyanathan Krishnan, Charlotte, NC (US); Michael C. Escandon, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 64 days.

(21) Appl. No.: 16/280,173

(22) Filed: Feb. 20, 2019

(65) Prior Publication Data

US 2019/0178495 A1 Jun. 13, 2019

Related U.S. Application Data

(62) Division of application No. 14/566,125, filed on Dec. 10, 2014, now abandoned.
(Continued)

(51) Int. Cl.
*F23R 3/06* (2006.01)
*F23R 3/00* (2006.01)
(Continued)

(52) U.S. Cl.
CPC .............. *F23R 3/002* (2013.01); *F01D 9/023* (2013.01); *F02C 3/04* (2013.01); *F23R 3/06* (2013.01);
(Continued)

(58) Field of Classification Search
CPC ........ F23R 3/28; F23R 3/30–305; F23R 3/36; F23R 3/48; F23R 3/002;
(Continued)

(56) References Cited

U.S. PATENT DOCUMENTS 6,018,950 A * 2/2000 Moeller ................... F01D 9/023
29/889.2
7,143,583 B2 * 12/2006 Hayashi ..................... F23R 3/18
60/776
(Continued)

FOREIGN PATENT DOCUMENTS

EP 1098141 A1 * 5/2001 .............. F23R 3/002

OTHER PUBLICATIONS

Timothy Ginter, Uprate Options for the MS9001 Heavy Duty Gas Turbine 2008, General Electric, pp. 1 and 5 (Year: 2008).*

*Primary Examiner* — Gerald L Sung
*Assistant Examiner* — Rene D Ford

(57) ABSTRACT

An improved combustion section for a gas turbine engine is disclosed. A fuel nozzle includes new features which provide improved injection patterns of oil fuel and cooling water, resulting in better control of combustion gas temperature and NOx emissions, and eliminated impingement of cooling water on walls of the combustor. A new combustor includes a plate-fin design which provides improved cooling, while the combustor also makes more efficient use of available cooling air and has an improved component life. A new transition component has a smoother shape which reduces stagnation of combustion gas flow and impingement (Continued)

of combustion gas on transition component walls, improved materials and localized thickness increases for better durability, and improved cooling features for more efficient usage of cooling air.

5 Claims, 23 Drawing Sheets

Related U.S. Application Data

(60) Provisional application No. 61/915,122, filed on Dec. 12, 2013.

(51) Int. Cl.
*F01D 9/02* (2006.01)
*F23R 3/16* (2006.01)
*F23R 3/28* (2006.01)
*F23R 3/36* (2006.01)
*F23R 3/48* (2006.01)
*F02C 3/04* (2006.01)

(52) U.S. Cl.
CPC .................. *F23R 3/16* (2013.01); *F23R 3/28* (2013.01); *F23R 3/36* (2013.01); *F23R 3/48* (2013.01); *F05B 2240/40* (2013.01); *F05D 2240/35* (2013.01); *F23R 2900/03041* (2013.01); *F23R 2900/03043* (2013.01); *Y02T 50/60* (2013.01)

(58) Field of Classification Search
CPC .... F23R 2900/03043; F23R 3/06; F23R 3/10; F23D 11/108; F01D 9/025; F01D 9/023
See application file for complete search history.

(56) References Cited

U.S. PATENT DOCUMENTS

| | | | | |
|---|---|---|---|---|
| 8,033,119 | B2* | 10/2011 | Liang | F01D 9/023 60/752 |
| 2005/0268617 | A1* | 12/2005 | Amond, III | F23R 3/343 60/776 |
| 2009/0282833 | A1* | 11/2009 | Hessler | F23R 3/002 60/757 |
| 2011/0067406 | A1* | 3/2011 | Widener | F23R 3/48 60/754 |

* cited by examiner

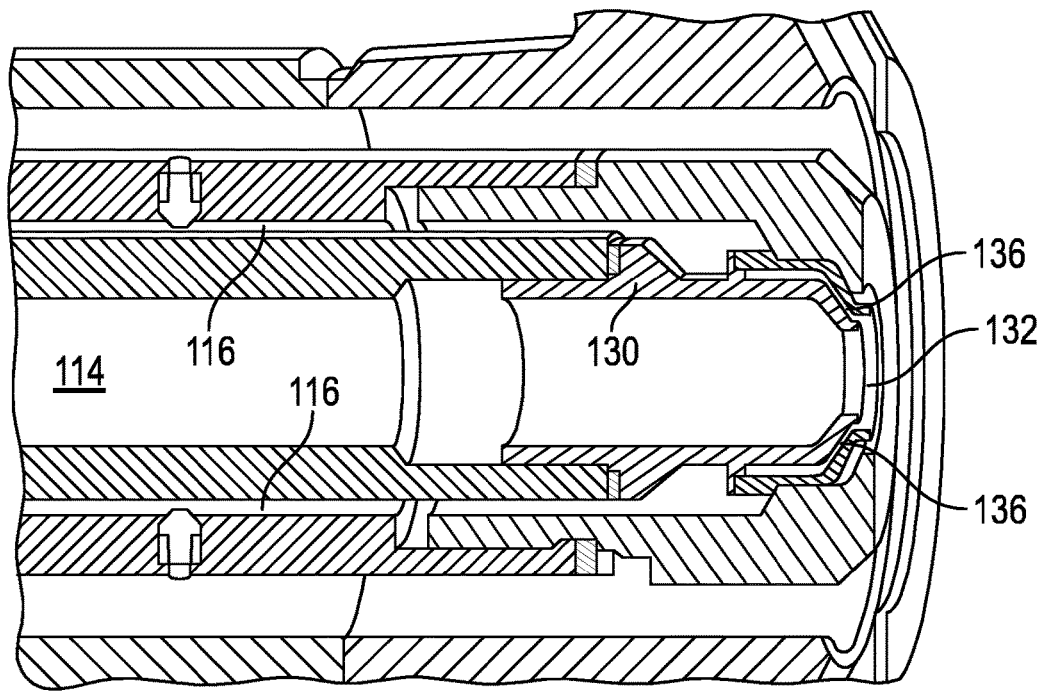
FIG. 4
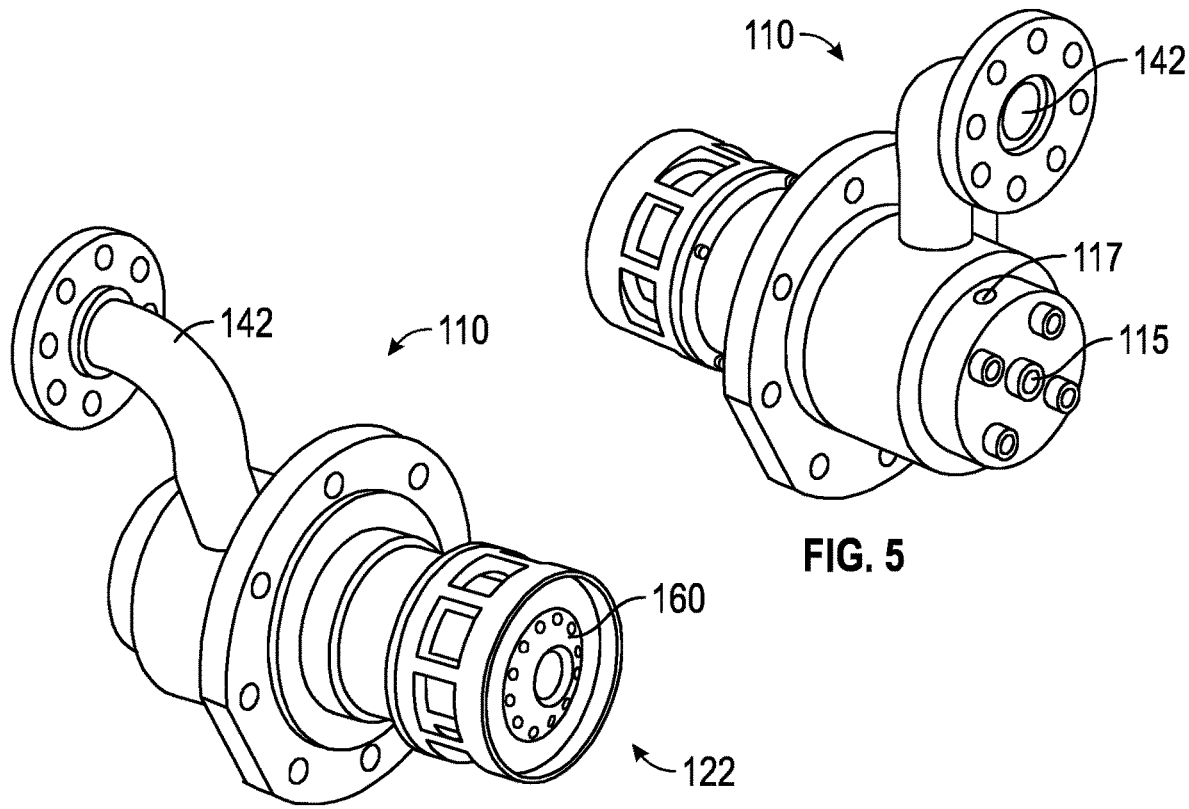
FIG. 5
FIG. 6

W501D5/D5A DF42 COMBUSTION SYSTEM

CROSS-REFERENCE TO RELATED APPLICATIONS

This application is a divisional application of U.S. patent application Ser. No. 14/566,125 which claims the benefit of the priority date of U.S. Provisional Patent Application Ser. No. 61/915,122, titled "NEW DF42 COMBUSTION SYSTEM", filed Dec. 12, 2013.

BACKGROUND OF THE INVENTION

Field of the Invention

This invention relates generally to an improved combustion system for a gas turbine and, more particularly, to a gas turbine combustion system including a fuel nozzle with improved injection patterns of gas and oil fuels and cooling water, a combustor with improved cooling and component life, and a transition component with an improved shape and materials and reverse-flow effusion cooling holes.

Description of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typical gas turbine engine includes a compressor section, a combustion section and a turbine section. The compressor section provides a compressed airflow to the combustion section where the air is mixed with a fuel, such as natural gas. The combustion section includes a plurality of circumferentially disposed combustors that receive the fuel to be mixed with the air and ignited to generate a working gas. The working gas expands through the turbine section and is directed across rows of blades therein by associated vanes. As the working gas passes through the turbine section, it causes the blades to rotate, which in turn causes a shaft to rotate, thereby providing mechanical work.

The temperature of the working gas is tightly controlled so that it does not exceed some predetermined temperature for a particular turbine engine design because too high of a temperature can damage various parts and components in the turbine section of the engine. However, it is desirable to cause the temperature of the working gas to be as high as possible without causing damage—because the higher the temperature of the working gas, the faster the flow of the gas, which results in more efficient operation of the engine.

In certain gas turbine engine designs, a portion of the compressed airflow is also used to provide cooling for certain components in the turbine section, such as the vanes, blades and ring segments. The more cooling and/or the more efficient cooling that can be provided to these components allows the components to be maintained at a lower temperature, and thus the higher the temperature the working gas can be. For example, by reducing the temperature of the compressed air, less compressed air is required to maintain the part at the desired temperature, resulting in a higher working gas temperature and a greater power and efficiency from the engine. Further, by using less cooling air at one location in the turbine section, more cooling air can be used at another location in the turbine section. In one known turbine engine design, 80% of the compressed air is mixed with the fuel for combustion, and 20% of the compressed air is used to cool the turbine parts. If less of that cooling air is used at one particular location as a result of the cooling air being lower in temperature, then more cooling air can be used at other areas for increased cooling.

In one known gas turbine engine design, the combustion section includes a fuel nozzle assembly, a combustor and a transition component, where the fuel nozzle assembly introduces fuel and cooling water into the combustor where it is mixed with air and burned, and the hot combustion gases pass through the transition component into the turbine section. Although the designs of the fuel nozzle assembly, the combustor and the transition component have been well developed over the years, continuous improvements in turbine performance, efficiency and durability are always sought after.

SUMMARY OF THE INVENTION

In accordance with the teachings of the present invention, an improved combustion section for a gas turbine engine is disclosed. A fuel nozzle includes new features which provide improved injection patterns of oil fuel and cooling water, resulting in better control of combustion gas temperature and NOx emissions, and eliminated impingement of cooling water on walls of the combustor. A new combustor includes a plate-fin design which provides improved cooling, while the combustor also makes more efficient use of available cooling air and has an improved component life. A new transition component has a smoother shape which reduces stagnation of combustion gas flow and impingement of combustion gas on transition component walls, improved materials and localized thickness increases for better durability, and improved cooling features for more efficient usage of cooling air.

Additional features of the present invention will become apparent from the following description and appended claims, taken in conjunction with the accompanying drawings.

BRIEF DESCRIPTION OF THE DRAWINGS

FIG. 4 is an isometric, fragmentary cutaway view illustrating details of one non-limiting example of an atomizer disposed at a downstream end of a multi-functional fuel nozzle embodying aspects of the present invention;

FIG. 5 is a rearwardly, isometric view of the multi-functional fuel nozzle shown in FIG. 3;

FIG. 6 is a forwardly, isometric view of the multi-functional fuel nozzle shown in FIG. 3;

DETAILED DESCRIPTION OF THE EMBODIMENTS

The following discussion of the embodiments of the invention directed to an improved combustion section for a gas turbine engine is merely exemplary in nature, and is in no way intended to limit the invention or its applications or uses.

Turbine Overview

Figure 1:
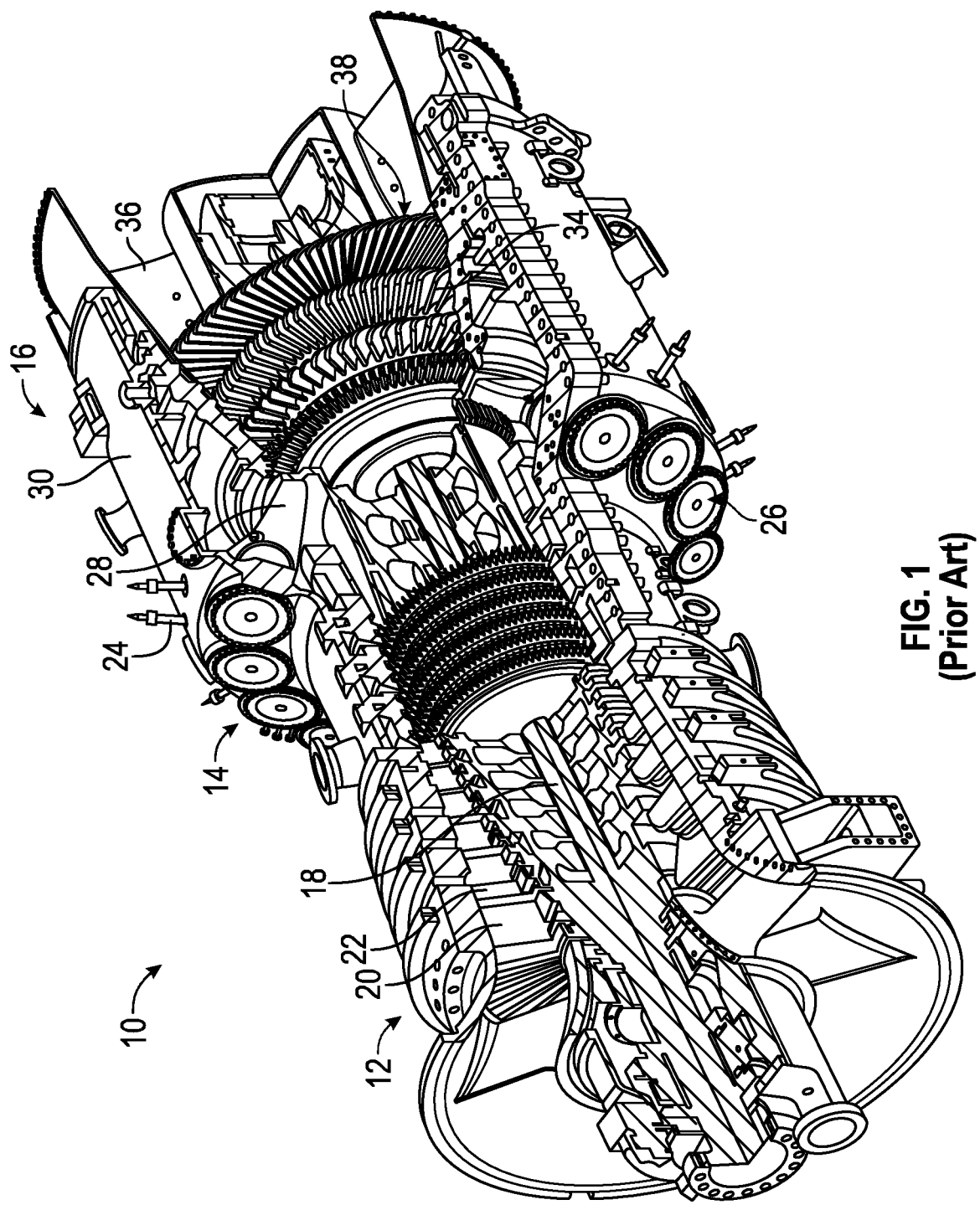
FIG. 1 is a cutaway, isometric view of a gas turbine engine.

FIG. 1 is a cutaway, isometric view of a gas turbine engine 10 including a compressor section 12, a combustion section 14 and a turbine section 16 all enclosed within an outer housing or casing 30, where operation of the engine 10 causes a central shaft or rotor 18 to rotate, thus creating mechanical work. The engine 10 is illustrated and described by way of a non-limiting example to provide context to the invention discussed below. Those skilled in the art will appreciate that other gas turbine engine designs can also be used in connection with the invention. Rotation of the rotor 18 draws air into the compressor section 12 where it is directed by vanes 22 and compressed by rotating blades 20 to be delivered to the combustion section 14, where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown), mixed with the compressed air and ignited by an igniter 24 to be combusted to create the working gas, which is directed by a transition component 28 into the turbine section 16. The working gas is then directed by circumferentially disposed stationary vanes (not shown in FIG. 1) in the turbine section 16 to flow across circumferentially disposed rotatable turbine blades 34, which causes the turbine blades 34 to rotate, thus rotating the rotor 18. Once the working gas passes through the turbine section 16 it is output from the engine 10 as an exhaust gas through an output nozzle 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Figure 2:
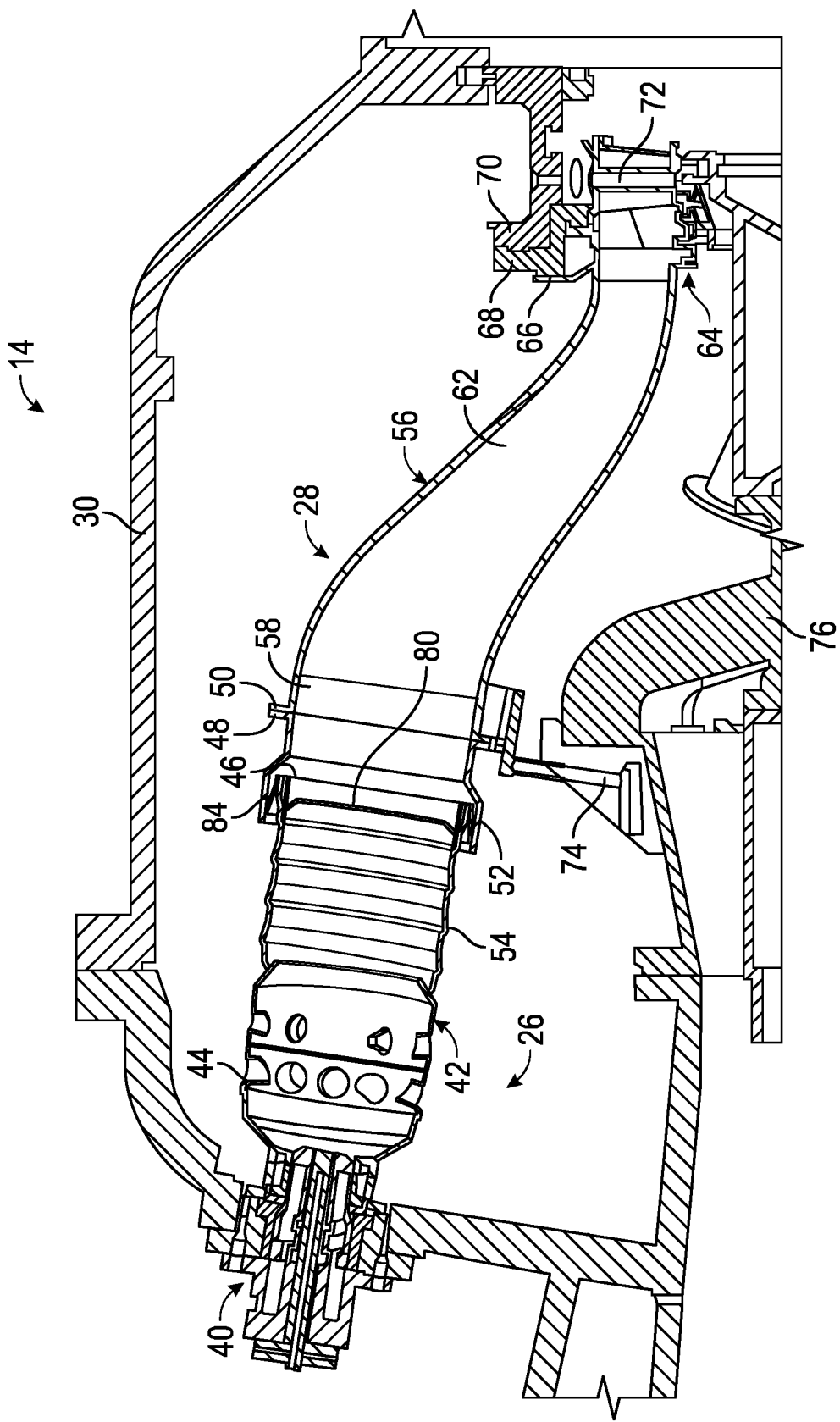
FIG. 2 is a cutaway, cross-sectional type view of a portion of a known combustion section for a gas turbine engine.

FIG. 2 is a cutaway, cross-sectional type view of a portion of the combustion section of a gas turbine engine having a similar design to the gas turbine engine 10 and showing one of the combustors 26 and one of the transition components 28. The combustor 26 includes a nozzle section 40 through which the fuel is injected into a cylindrical combustor basket 42 in a controlled manner as is well understood by those skilled in the art. Air from the compressor section 12 enters the combustor basket 42 through circumferentially disposed openings 44, where the air/fuel mixture is ignited by the igniters 24 (see FIG. 1) to generate the hot working gas. The working gas flows through a cylindrical basket liner 54 that defines an enclosure of the basket 42 towards a basket exit 46 at an end of the basket 42 opposite to the nozzle 40.

Fuel Nozzle

A fuel nozzle provides fuel into an upstream end of each of the combustors 26. Fuel nozzles are typically designed to be able to provide either gaseous or liquid (oil) fuel to the combustor 26. Fuel nozzles also typically provide water injection into the combustor 26, where the water reduces the maximum temperature of the combustion gases in order to reduce NOx (oxides of nitrogen) emissions. Several fuel nozzle improvements over previous designs have been made, as discussed below.

One design for an improved fuel nozzle with a dual-orifice atomizer configured to form intersecting atomized spray cones, is described in International Patent Application No. PCT/US2014/051065, titled "MULTI-FUNCTIONAL FUEL NOZZLE WITH A DUAL-ORIFICE ATOMIZER", filed Aug. 14, 2014, assigned to the assignee of the present application.

The improved nozzles described below have been developed in recognition of the fact that some issues that can arise in the context of certain prior art multi-fuel nozzles. For example, to reduce NOx emissions, these multi-fuel nozzles are known to inject water into a combustor basket. This injection is typically in the form of poorly atomized water jets, streams, or large droplets that can impinge on inner liner wall of the basket, and, consequently, these water jets or streams can impose substantial thermal distress on the liner walls and eventually lead to a shortened life of such liner walls.

At least in view of such recognition, proposed below is an innovative multi-functional fuel nozzle that is cost-effectively and reliably effective for injecting water in the form of a cone of finely atomized water. The atomized cone may be configured to reduce NOx emissions while reducing water consumption and meeting pertinent combustion performance requirements, such as combustion dynamics, liner wall temperatures, etc. The proposed fuel nozzle can provide enhanced operational versatility through a multiple operational functionality. This multiple operational functionality can be optionally interchanged depending on the needs of a given application. Further aspects of the proposed multi-functional fuel nozzle will be discussed in the disclosure below.

Furthermore, components utilized in these multi-fuel nozzles tend to overheat causing cracking and erosion in such components. This leads to costly repairs and time consuming servicing operations in order to replace defective components in the nozzle. In recognition of this, also proposed below is an innovative multi-functional fuel nozzle that cost-effectively and reliably provides back side cooling to a heat shield disposed at a downstream end of the nozzle. The proposed heat shield includes cooling channels configured to target relatively hotter regions in a nozzle cap. Further aspects of the proposed multi-functional fuel nozzle will be discussed in the disclosure below.

Additionally proposed below is an innovative multi-functional fuel nozzle that cost-effectively and reliably includes an atomizer array in combination with a centrally-located atomizer. This combination is effective for injecting water in the form of one or more cones of finely atomized water. The one or more atomized cones may be configured to reduce NOx emissions while reducing water consumption and meeting pertinent combustion performance requirements, such as combustion dynamics, liner wall temperatures, etc. The proposed fuel nozzle can provide enhanced operational versatility through a multiple operational functionality. This multiple operational functionality can be optionally interchanged depending on the needs of a given application. Further aspects of the proposed multi-functional fuel nozzle will be discussed in the disclosure below.

Figure 3:
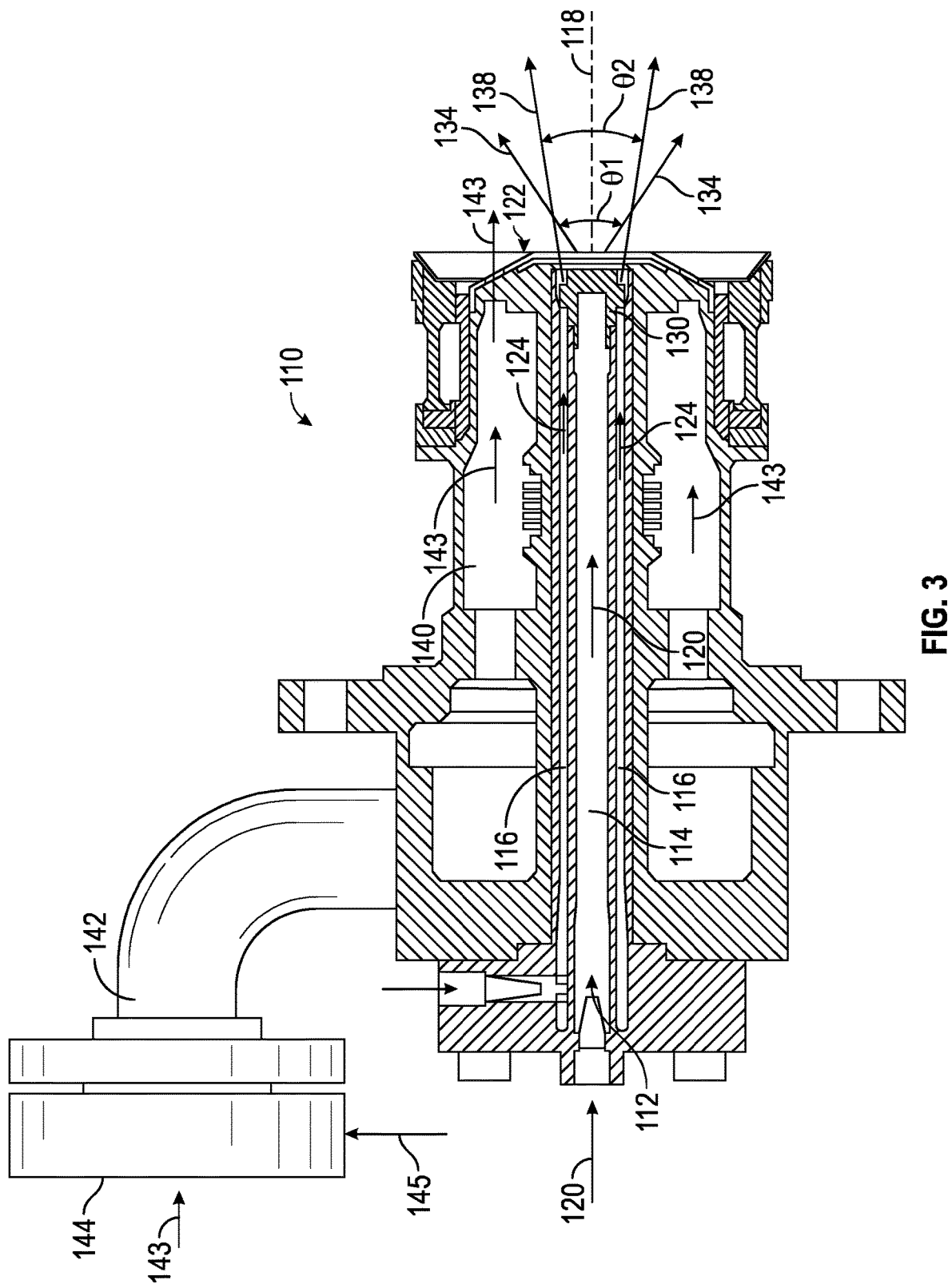
FIG. 3 is a cutaway, side view of one non-limiting embodiment of a multi-functional fuel nozzle embodying aspects of the present invention.

FIG. 3 is a cutaway, side view of one non-limiting embodiment of a multi-functional fuel nozzle 110 embodying aspects of the present invention. In this embodiment, multi-functional fuel nozzle 110 includes an annular fuel-injecting lance 112 including a first fluid circuit 114 and a second fluid circuit 116. First fluid circuit 114 is centrally disposed within fuel-injecting lance 112. First fluid circuit 114 extends along a longitudinal axis 118 of lance 112 to convey a first fluid (schematically represented by arrows 120) to a downstream end 122 of lance 112.

Second fluid circuit 116 is annularly disposed about first fluid circuit 114 to convey a second fluid (schematically represented by arrows 124) to downstream end 122 of lance 112. As may be appreciated in FIG. 5, a centrally disposed first inlet 115 may be used to introduce first fluid 120 into first fluid circuit 114. Similarly, a second inlet 117 may be used to introduce second fluid 124 into second fluid circuit 116.

As will be discussed in greater detail below, in one non-limiting embodiment one of the first or second fluids 120, 124 may comprise a liquid fuel, such as an oil distillate, conveyed by one of the first and second fluid circuits 114, 116 during a liquid fuel operating mode of the combustion turbine engine. The other of the first and second fluids 120, 124, conveyed by the other of first and second fluid circuits 114, 116, may comprise a selectable non-fuel fluid, such as air or water.

An atomizer 130 is disposed at downstream end 122 of lance 112. As may be appreciated in FIG. 4, in one non-limiting embodiment, atomizer 130 includes a first injection orifice 132 responsive to first fluid circuit 114 to form a first atomized injection cone (schematically represented by lines 134 (FIG. 3)). Atomizer 130 further includes a second injection orifice 136 responsive to second fluid circuit 116 to form a second atomized injection cone (schematically represented by lines 138 (FIG. 3)). Thus, it will be appreciated that in this embodiment, atomizer 130 comprises a dual orifice atomizer.

In one non-limiting embodiment, orifices 132, 136 of atomizer 130 are respectively configured so that the first and second injection cones 134, 138 formed with atomizer 130 comprise concentric patterns, such as cones that intersect with one another over a predefined angular range. Without limitation, such patterns may comprise solid cones, semi-solid cones, hollow cones, fine spray cones, sheets of air, or individual droplets (spray).

In one non-limiting embodiment, an angular range ($\theta_1$, (FIG. 3)) of first atomized injection cone 134 extends from approximately 80 degrees to approximately 120 degrees. In a further non-limiting embodiment, the angular range $\theta_1$ of first atomized injection cone 134 extends from approximately 90 degrees to approximately 115 degrees. In still a further non-limiting embodiment, the angular range $\theta_1$ of first atomized injection cone 134 extends from approximately 104 degrees to approximately 110 degrees. These angles can be further varied to accommodate any future varied operational needs as they may arise.

In one non-limiting embodiment, an angular range ($\theta_2$) of second atomized injection cone 138 extends from approximately 40 degrees to approximately 90 degrees. In a further non-limiting embodiment, the angular range θ2 of second atomized injection cone 138 extends from approximately 60 degrees to approximately 80 degrees.

It is believed that relatively larger angular differences between first and second atomized injection cones 134, 138 tend to provide enhanced atomization during an ignition event of the liquid fuel. Conversely, relatively smaller angular differences between first and second atomized injection cones 134, 138 tend to provide enhanced NOx reduction capability during oil fuel operation. For example, in a non-limiting combination where the angular range θ1 of first atomized injection cone 134 is approximately 110 degrees and the angular range θ2 of second atomized injection cone 138 is approximately 40 degrees would likely provide enhanced atomization during the ignition event of the liquid fuel compared to, for example, another non-limiting combination where the angular range θ1 of first atomized injection cone 134 is approximately 110 degrees and the angular range θ2 of second atomized injection cone 138 is approximately 80 degrees. As noted above, the latter example combination would likely provide enhanced NOx reduction capability during oil fuel operation. Broadly, the predefined angular range of intersection of the first and second atomized cones may be tailored to optimize a desired operational characteristic of the engine, such as atomization performance during an ignition event of the liquid fuel, NOx abatement performance, etc.

In accordance with aspects of disclosed embodiments, the operational functionality respectively provided by first and second fluid circuits 114, 116 and the first and second injection cones 134, 138 formed by atomizer 130 may be optionally interchanged based on the needs of a given application. That is, the type of fluids respectively conveyed by first and second fluid circuits 114, 116 may be optionally interchanged based on the needs of a given application.

For example, in one non-limiting embodiment, during an ignition event of the liquid fuel, the selectable non-fuel fluid may comprise air, which in one example case is conveyed by first fluid circuit 114, and, in this case, the first atomized injection cone 138 comprises a cone of air, and the liquid fuel comprises an oil fuel, which is conveyed by second fluid circuit 116, and, in this case, the second atomized injection cone 134 comprises a cone of atomized oil fuel. In this embodiment, subsequent to the ignition event of the liquid fuel, the selectable non-fuel fluid comprises water (in lieu of air), which is conveyed by first fluid circuit 114, and the first atomized injection cone 134 comprises a cone of atomized water.

In one alternative non-limiting embodiment, during the ignition event of the liquid fuel—which in this alternative embodiment is conveyed by first circuit 114 in lieu of second circuit 116—and, thus in this case, the first atomized injection cone 134 comprises a cone of atomized oil fuel, and the selectable non-fuel fluid comprises air, which in this case is conveyed by second circuit 116 in lieu of first circuit 114, and, thus the second atomized injection cone 138 comprises a cone of air. Subsequent to the ignition event of the liquid fuel, the selectable non-fuel fluid comprises water (in lieu of air), which in this alternative embodiment is conveyed by second fluid circuit 116, and thus second atomized injection cone 138 comprises a cone formed of atomized water.

In one non-limiting embodiment, a plurality of gas fuel channels 140 is circumferentially disposed about the longitudinal axis 118 of fuel lance 112. A single annular gas channel may also be used. Gas fuel channels 140 are positioned circumferentially outwardly relative to fuel lance 112. A gas inlet 142 may be used to introduce gas fuel (schematically represented by arrows 143) into gas fuel channels 140. In one non-limiting embodiment, during a gas fuel operating mode of the engine, the selectable non-fuel fluid comprises water, which is conveyed by at least one of the first and second fluid circuits 114, 116, and thus at least one of the first and second injection cones 138, 134 comprises a respective cone formed of atomized water. Optionally, during the gas fuel operating mode of the engine, the plurality of gas fuel channels 140 may be configured to convey water mixed with fuel gas alone or in combination with at least one of the first and second fluid circuits 114, 116. In one non-limiting embodiment, water (schematically represented by arrow 145) may be introduced into the plurality of gas fuel channels 140 by way of a doughnut-shaped inlet 144 (FIG. 3).

Another design for an improved fuel nozzle, with an integral heat shield, is described in International Patent Application No. PCT/US2014/051056, titled "MULTI-FUNCTIONAL FUEL NOZZLE WITH A HEAT SHIELD", filed Aug. 14, 2014, assigned to the assignee of the present application.

Figure 7:
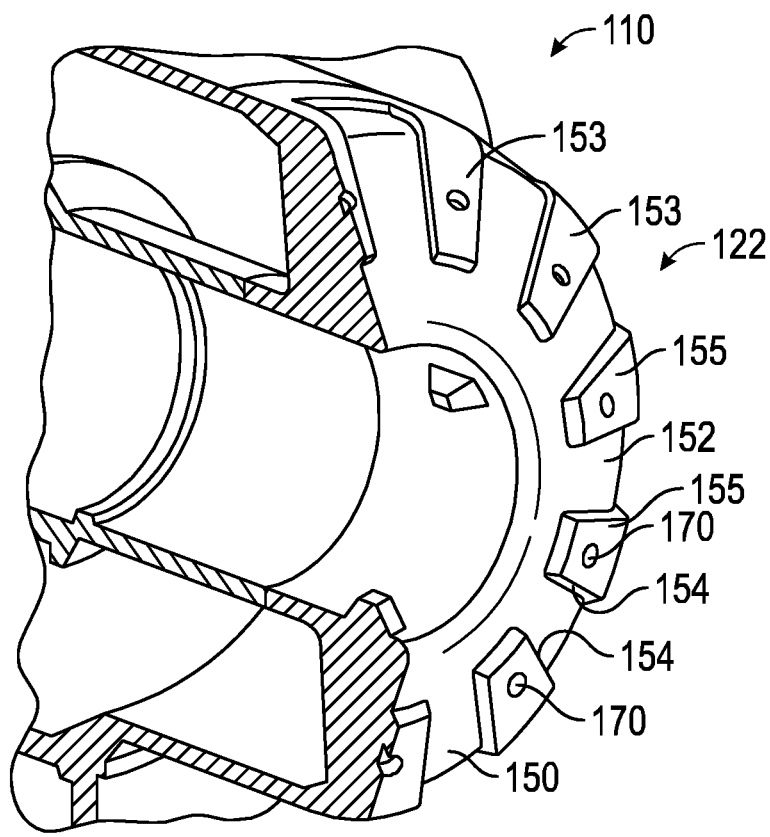
FIG. 7 is an isometric, fragmentary cutaway view illustrating details of one non-limiting example of a nozzle cap disposed at the downstream end of a multi-functional fuel nozzle embodying aspects of the present invention.
Figure 8:
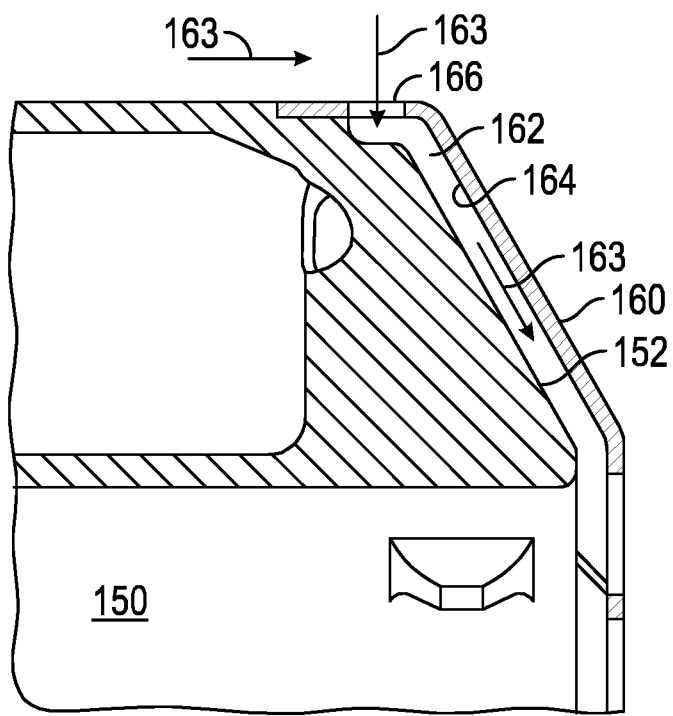
FIG. 8 is a fragmentary side view of the nozzle cap shown in FIG. 7 and a heat shield mounted on a forward face of the nozzle cap.
Figure 9:
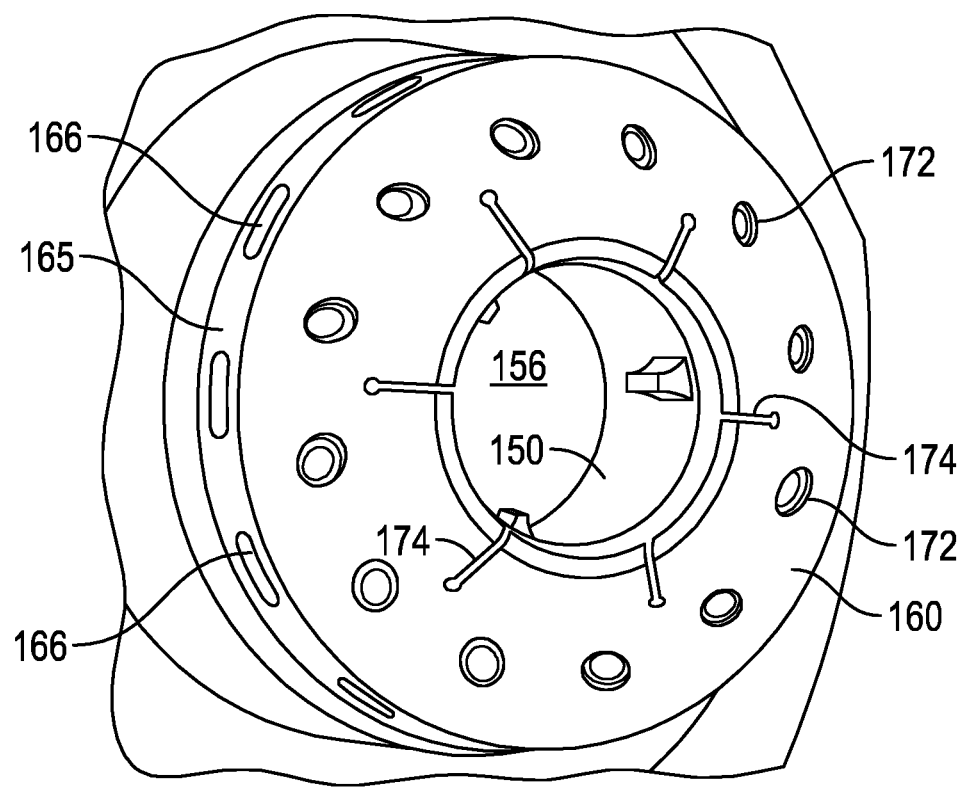
FIG. 9 is a forwardly isometric view illustrating the heat shield and further illustrating a centrally-disposed bore in the nozzle cap.

FIG. 7 is an isometric, fragmentary cutaway view illustrating details of one non-limiting embodiment of a nozzle cap 150 disposed at downstream end 122 of multi-fuel nozzle 110. As may be appreciated in FIGS. 8 and 9, a heat shield 160 is mounted onto nozzle cap 150. A plurality of cooling channels 162 (for simplicity of illustration just one cooling channel is shown in FIG. 8 for conveying a cooling medium, such as air (schematically represented by arrows 163 (FIG. 8)), is arranged between a forward face 152 of nozzle cap and a corresponding back side 164 of the heat shield 160.

In one non-limiting embodiment, nozzle cap 150 includes a plurality of castellations 153 (FIG. 7) circumferentially arranged on forward face 152 of nozzle cap 150. Mutually facing lateral surfaces 154 of adjacent castellations define respective recesses on forward face 152 of nozzle cap 150. First portions of back side 164 of heat shield 160 abut against respective top surfaces 155 of castellations 153 on forward face 152 of nozzle cap 150. Second portions of back side 164 of heat shield 160 (the portions that do not abut against the respective top surfaces 155 of castellations 153 are arranged to close corresponding top areas of the recesses on forward face 152 of nozzle cap 150 to form the plurality of cooling channels 162.

Figure 11:
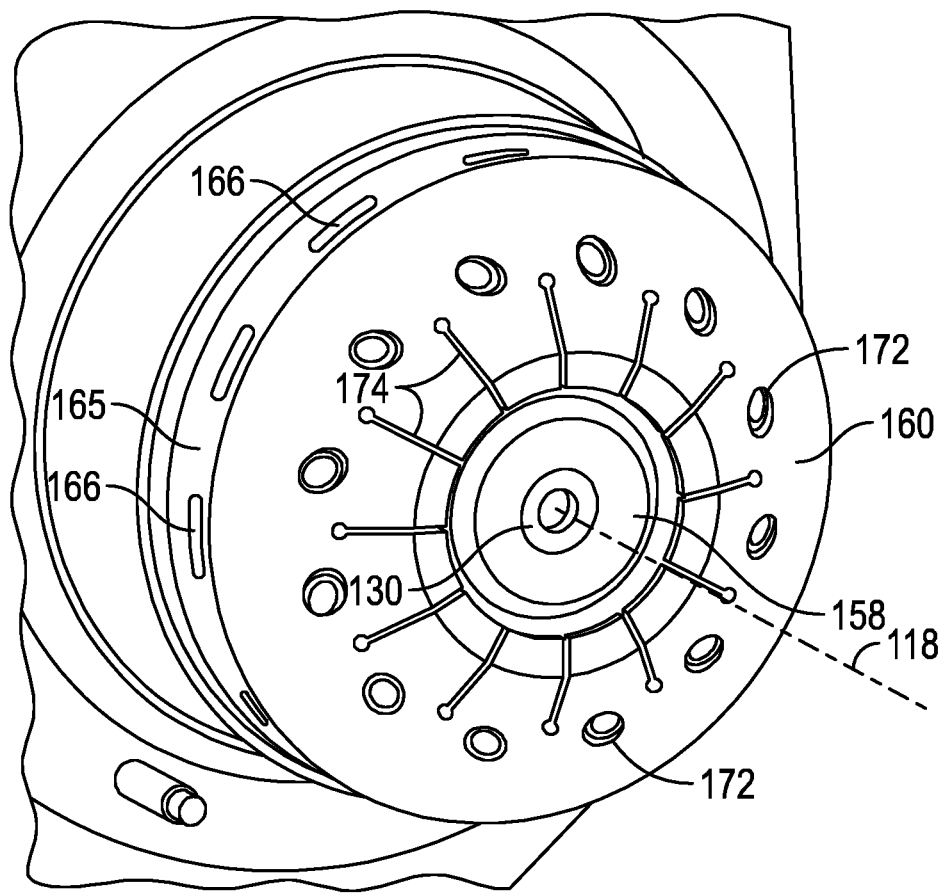
FIG. 11 is forwardly isometric view illustrating the heat shield and further illustrating one non-limiting example of an atomizer assembly installed in the bore of the nozzle cap.

In one non-limiting embodiment, heat shield 160 comprises an annular lip 165 (FIGS. 9, 11) including a plurality of slots 166 circumferentially disposed about longitudinal axis 118 of nozzle 110. Slots 166 are positioned to feed cooling air to cooling channels 162. Nozzle cap 150 comprises a centrally located bore 156 (FIG. 9) arranged to accommodate a downstream portion of fuel lance 112 of nozzle 110. Downstream portion of fuel lance 112 includes an atomizer assembly 158 (FIG. 11), such as may include atomizer 130.

In one non-limiting embodiment, cooling channels 162 are arranged to convey the cooling medium in a direction towards the centrally located bore 156 to discharge the cooling medium over a forward face of atomizer assembly 158.

Figure 10:
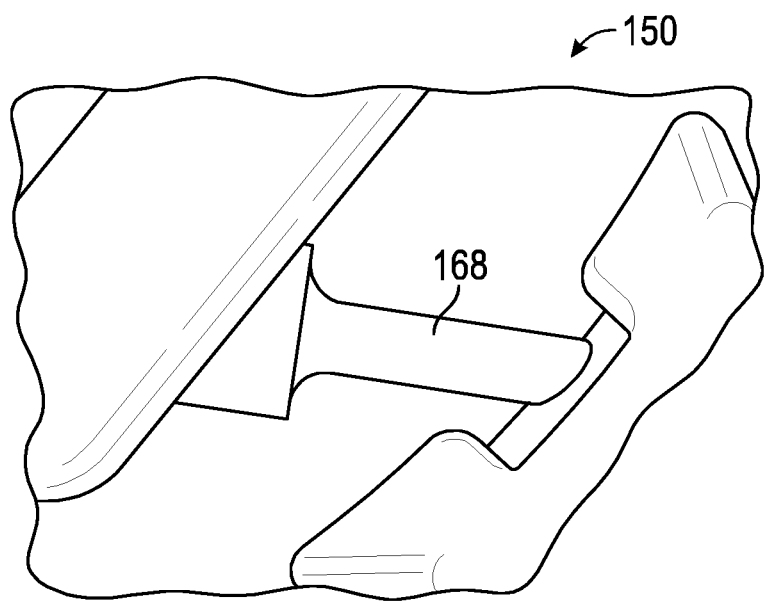
FIG. 10 is schematic representation of a gas fuel channel in the nozzle cap.

Nozzle cap 150 further comprises a plurality of gas fuel channels 168 (FIG. 10) circumferentially disposed about longitudinal axis 118 of nozzle 110. Gas fuel channels 168 comprise outlets 170 (FIG. 7) arranged at respective top surfaces 155 of castellations 153. Heat shield 160 similarly comprises a plurality of openings 172 in correspondence with the outlets 170 arranged at the respective top surfaces of the castellations.

In one non-limiting embodiment, heat shield 160 comprises a plurality of slits 174 radially extending a predefined distance from an inner diameter of heat shield 160. Slits 174 may be interposed between at least some adjacent pairs of the plurality of openings 172 in heat shield 160. As will be appreciated by those skilled in the art, slits 174 provide stress relief functionality to heat shield 160.

Yet another design for an improved fuel nozzle, with an atomizer array, is described in International Patent Application No. PCT/US2014/051077, titled "MULTI-FUNCTIONAL FUEL NOZZLE WITH AN ATOMIZER ARRAY", filed Aug. 14, 2014, assigned to the assignee of the present application.

Figure 12:
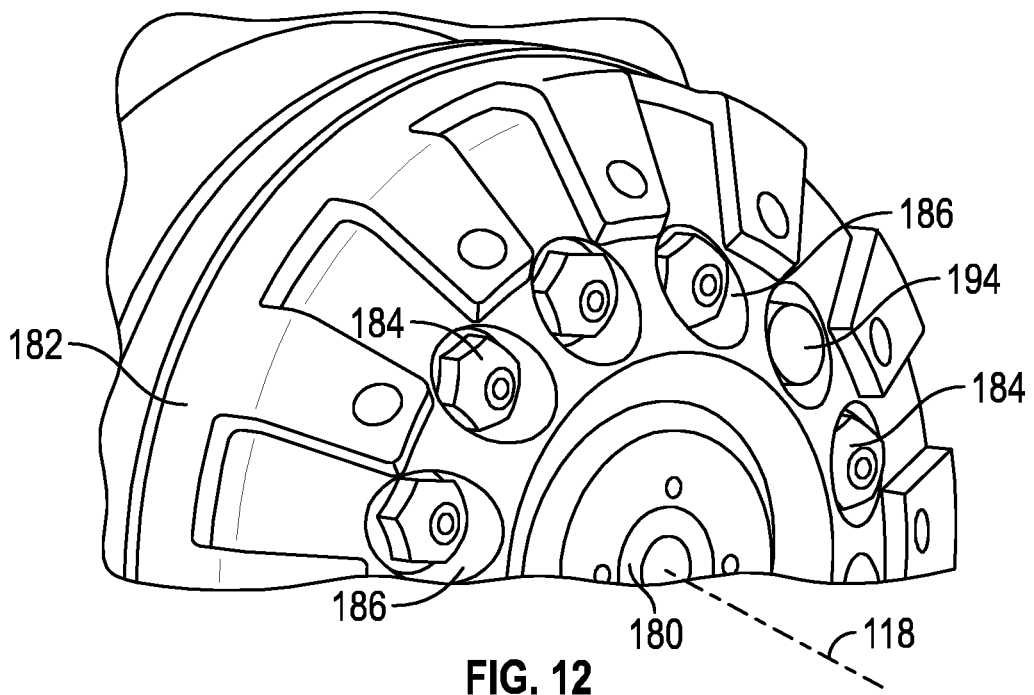
FIG. 12 is a forwardly, fragmentary isometric view illustrating details of another non-limiting example of a nozzle cap including an annular array of atomizers disposed at the downstream end of a multi-functional fuel nozzle embodying further aspects of the present invention.
Figure 13:
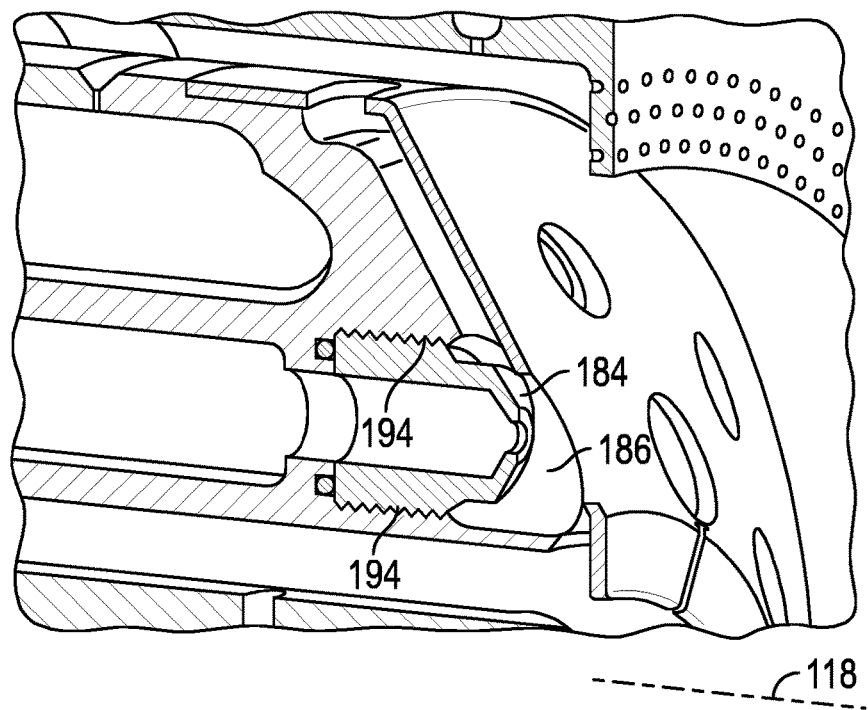
FIG. 13 is a cutaway, fragmentary isometric view illustrating details of one atomizer in the array of atomizers.
Figure 14:
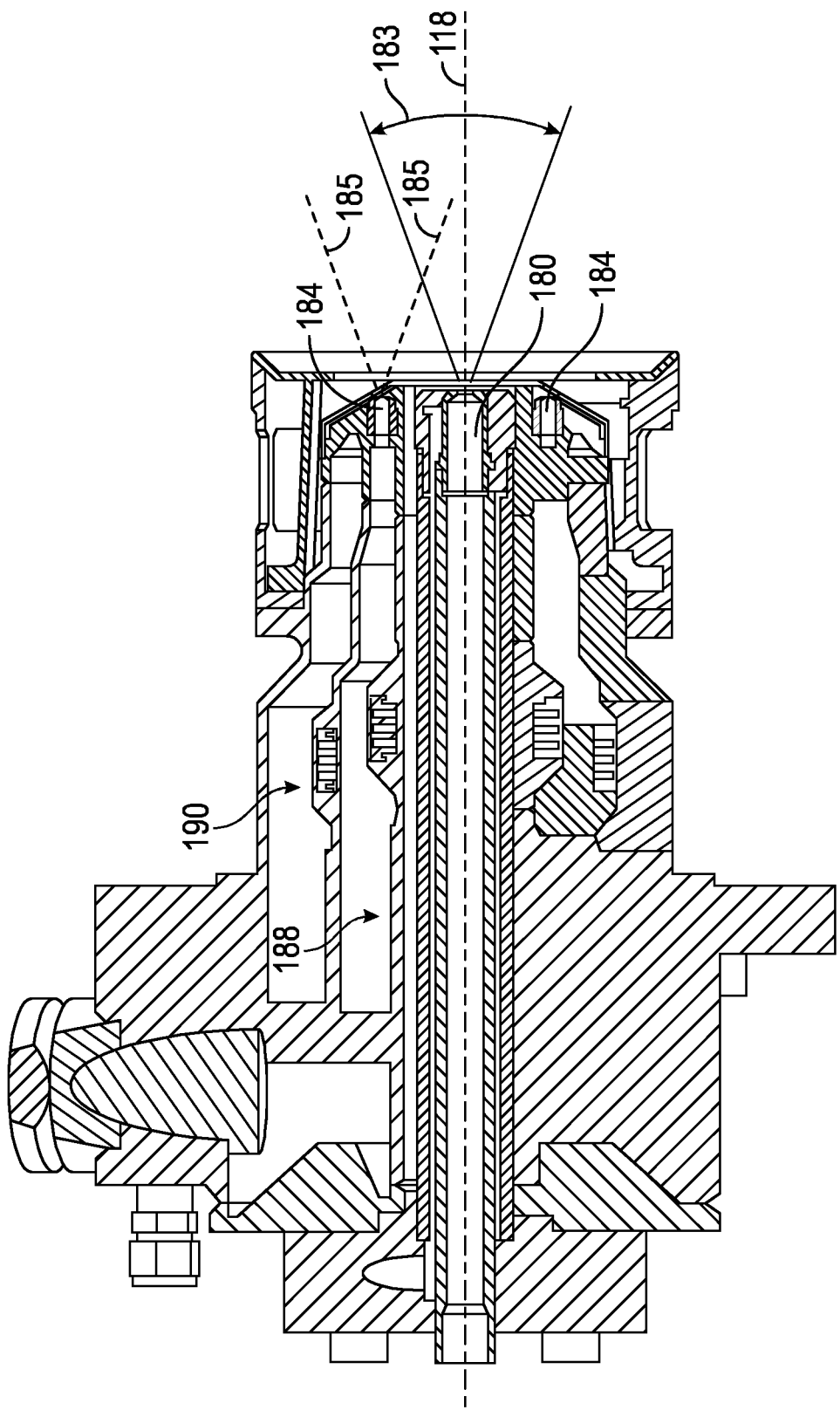
FIG. 14 is a cutaway, side view of one non-limiting embodiment of a multi-functional fuel nozzle embodying the annular array of atomizers.

As illustrated in FIGS. 12-14, in one non-limiting embodiment, a centrally-located atomizer 180 (e.g., a single orifice atomizer) may be disposed in the centrally located bore of a nozzle cap 182 to form a first atomized injection cone, schematically represented by lines 183 (FIG. 14). In this embodiment, an array of atomizers 184 may be installed in nozzle cap 182 to form an array of respective second atomized injection cones (one cone in the array is schematically represented by lines 185 (FIG. 14)). Atomizer array 184 may be circumferentially disposed about longitudinal axis 118 of the lance. Atomizer array 184 may be positioned radially outwardly relative to centrally-located atomizer 180 to form an array of respective second atomized injection cones. In one non-limiting embodiment, atomizer array 184 comprises an annular array and nozzle cap 182 comprises an annular array of atomizer outlets 86 disposed on a forward face of nozzle cap 182.

In one non-limiting embodiment, during a liquid fuel operating mode of the engine, centrally-located atomizer 180 is coupled to a first fluid circuit 186 (FIG. 14) conveying a liquid fuel to form an atomized cone of liquid fuel and the array of circumferentially disposed atomizers 184 is coupled to a second fluid circuit 188 conveying water to form an atomized array of water cones.

In one alternative embodiment, during a liquid fuel operating mode of the engine, centrally-located atomizer 180 is coupled to first fluid circuit 186, which in this alternative embodiment conveys water to form an atomized cone of water and the array of circumferentially disposed atomizers 184 is coupled to second fluid circuit 188, which in this alternative embodiment conveys liquid fuel to form an atomized array of liquid fuel cones.

Nozzle cap 182 further comprises a plurality of gas fuel channels 190 circumferentially disposed about longitudinal axis 118. The plurality of gas fuel channels 190 being positioned radially outwardly relative to array of atomizers 184.

In one non-limiting embodiment, during a gas fuel operating mode of the engine, the array of atomizers 184 is coupled to first fluid circuit 186 conveying water to form an atomized array of water cones. In one alternative embodiment, during a gas fuel operating mode of the engine, centrally-located atomizer 180 is coupled to second fluid circuit 188, which in this alternative embodiment conveys water to form an atomized cone of water.

Figure 15:
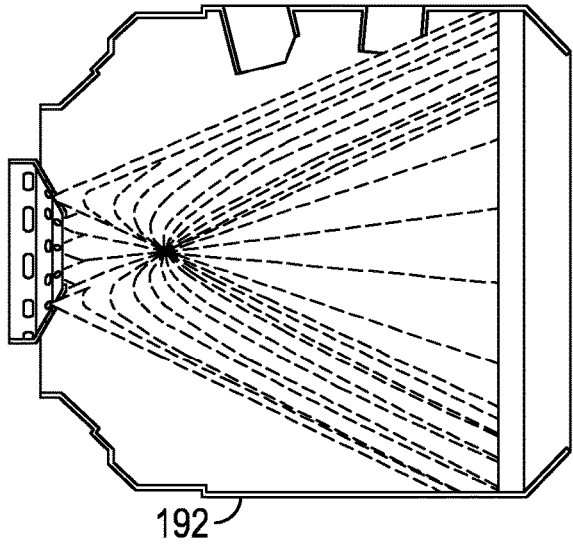
FIGS. 15 and 16 illustrate respective non-limiting embodiments comprising a different number of atomizers in the array and a different angular spread in the injections cones formed with such atomizer arrays.
Figure 16:
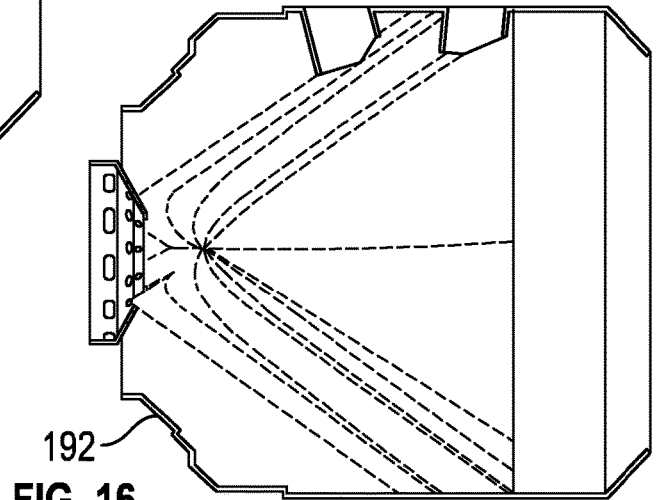

As may be conceptually appreciated in FIGS. 15 and 16, the numbers of atomizers in the array and/or an angular spread of the respective second atomized injection cones may be arranged to target a desired zone in a combustor basket 192. FIG. 15 illustrates a non-limiting embodiment where the number of atomizers in the array is 12 and the angular spread of each cone is approximately 50 degrees. FIG. 16 illustrates a non-limiting embodiment where the number of atomizers in the array is 6 and the angular spread of each cone is approximately 70 degrees.

In one non-limiting embodiment, the array of atomizers 184 may be affixed to nozzle cap 182 by way of respective threaded connections 194 (FIG. 13). This facilitates removal and replacement of respective atomizers in the array of atomizers. In one optional embodiment, the number of atomizers in the array 184 may involve removing at least some of the atomizers and plugging with respective suitable plugs 194 (FIG. 12 shows one example plugged outlet) the outlets previously occupied by the removed atomizers.

In operation, aspects of the disclosed multi-functional fuel nozzle effectively allow meeting NOx target levels within an appropriate margin, and further allow practically eliminating water impingement on the liner walls of a combustor basket and this is conducive to improving liner durability and appropriately meeting predefined service intervals in connection with these components of the turbine engine.

Combustor

As described previously relative to FIGS. 1 and 2, the combustor 14 is where fuel is mixed with air, ignited and burned. As such, management of thermal loads in the combustor 14 is very important. One design for improved thermal management at an exit end of the combustor 14 is described in U.S. patent application Ser. No. 14/525,279, titled "D5/D5A DF-42 DOUBLE WALLED EXIT CONE AND SPLASH PLATE", filed Oct. 28, 2014, assigned to the assignee of the present application.

Figure 17:
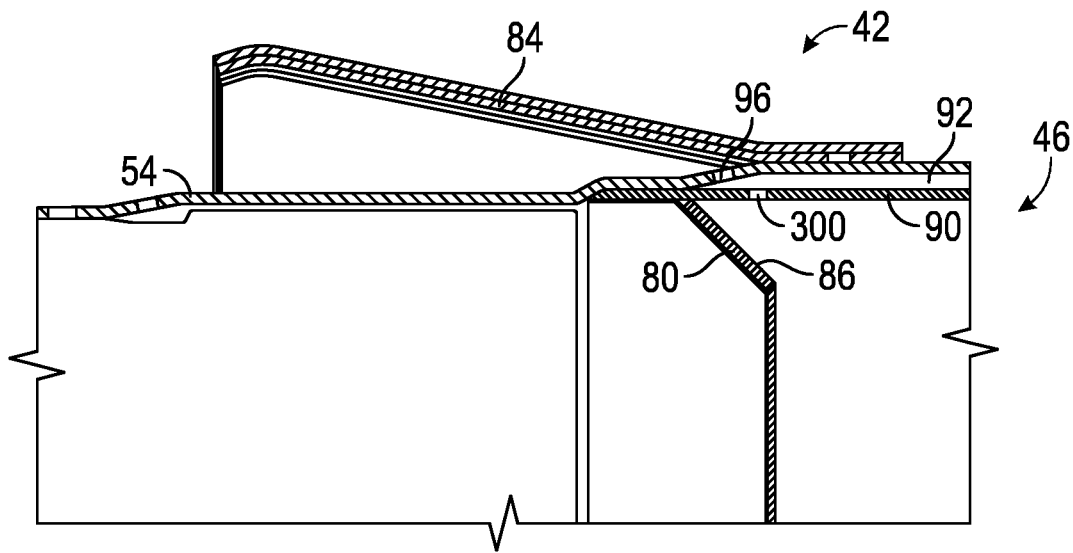
FIG. 17 is a cutaway, cross-sectional type view of the area at the end of the basket liner of the combustion section shown in FIG. 2.

FIG. 17 is broken-away, cross-sectional type view of a portion of the output end of the basket 42. Consistent item reference numbering is maintained with FIG. 1. An annular exit cone 80 is provided within the basket liner 54 upstream from the basket exit 46 through which the hot working gas exits the basket 42. The end of the basket liner 54 is slid into a transition cylinder 52 having an annular mounting flange 48. A spring clip 84 is secured to an outside surface of the basket liner 54 at the basket exit 46 and provides spring force against the transition cylinder 52 to hold the basket 42 within the transition cylinder 52.

The transition component 28 includes an annular flange 50 at an input end that is mounted to the annular flange 48 of the transition cylinder 52. The transition component 28 also includes a curved transition section 56 extending from the flange 50 that includes an inlet ring portion 58 and defining an internal chamber 62. An end of the transition section 56 opposite to the flange 50 includes a seal 64 and a mounting flange 66 through which the working gas is output to the turbine section 16. The transition section 56 transitions from a circular opening at the input end of the component 28 to a rectangular opening at the output end of the component 28. The mounting flange 66 is mounted to a ring bracket 68 that is secured to a blade ring 70, all well known to those skilled in the art. The seal 64 of the transition section 56 is positioned adjacent to row 1 vanes 72 that receive and direct the hot gas to the row 1 blades. A mounting bracket 74 is mounted to the transition section 56, as shown, and to a compressor exit diffuser 76.

Analysis has shown that the exit cone 80 creates a recirculation zone within the area between the exit cone 80 and the basket exit 46 that causes hot gas to be recirculated back towards the combustor basket 42 and impinge a backside surface 86 of the exit cone 80 and liner at basket exit 46. Basket liner at exit 46 has been protected in past through implementation of splash plate 90. For the current combustor basket design, it is not possible to apply a thermal barrier coating (TBC) to the outer surface of the combustor basket 42 including the backside surface 86 of the exit cone 80 because that coating would insulate the basket 42 from cooling air provided to cool the basket 42. In order to address this problem, it is known in the art to provide an annular splash plate 90 mounted to the basket liner 54 within the basket exit 46, but outside of the exit cone 80, as shown, that defines a cooling channel 92 therebetween. A series of spaced apart cooling feed holes 96 are provided through the basket liner 54 at the basket exit 46 that receive cooling air flowing between the spring clip 84 and the basket liner 54 and into the channel 92. Further, a series of spaced apart feed holes 300 are provided in the splash plate 90 that allow the cooling air flowing through the feed holes 96 to also flow through the splash plate 90 and cool the exit cone 80. However, this creates a problem in that because the cooling air is fed to the exit cone 80 by the same feed holes that provide cooling flow to the splash plate 90, there is a reduction in the amount of cooling air that can be provided to the exit cone 80. This can be compensated for by increasing the size of the feed holes 96 and 300 for the cooling air, however, it is difficult to control the cooling air that is split between the exit cone 80 and the splash plate channel 92.

The present invention proposes a solution to this problem that allows all relevant surfaces of the basket liner 54, the basket exit 46 and the exit cone 80 to be provided with a thermal barrier coating, and also allows a controlled adjustment of cooling air supplied to the exit cone 80 and the splash plate 90.

Figure 18:
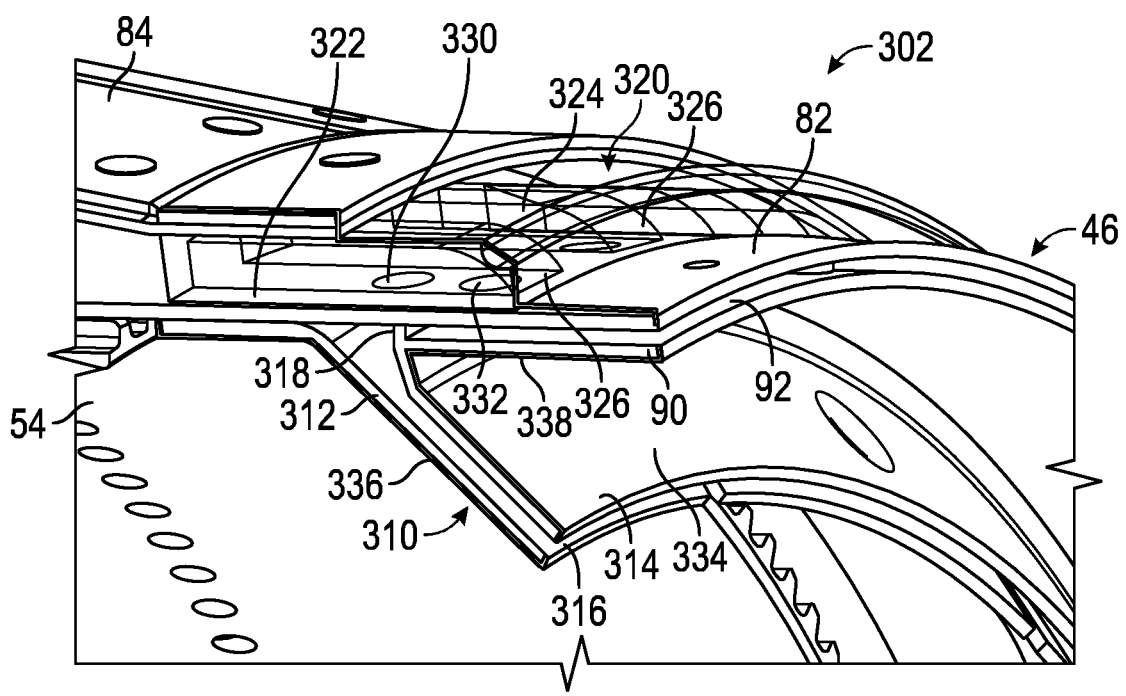
FIG. 18 is a cutaway, isometric view of a portion of a double-wall exit cone and splash plate at an output end of a combustor basket liner of a gas turbine engine.
Figure 19:
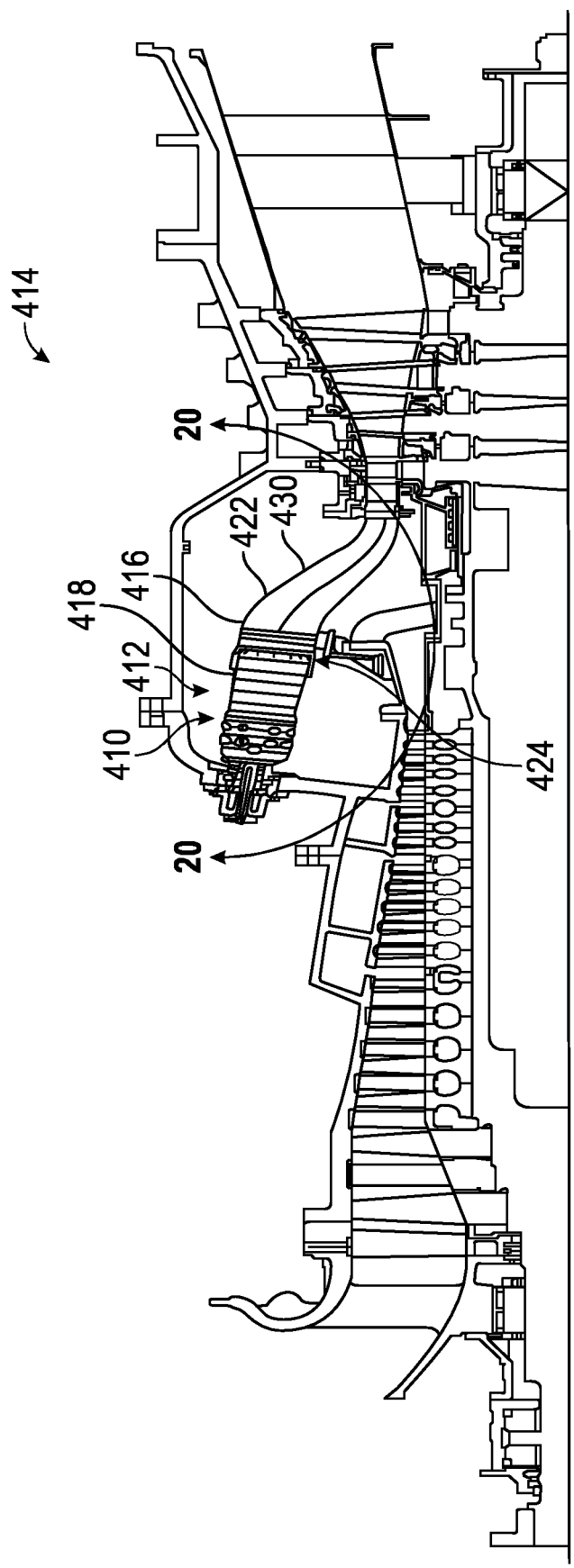
FIG. 19 is cross-sectional side view of a turbine engine including the hot gas path cooling system.

FIG. 18 is a broken-away, isometric view of a portion of an output end of a combustor basket 302 according to the proposed design, where like elements to the discussion above are shown by the same reference number. In one design change, the exit cone 80 is replaced with a double-wall exit cone 310 including an inner cone wall 312 and an outer cone wall 314 defining an annular channel 316 therebetween, where both of the walls 312 and 314 are mounted to the basket liner 54 at the basket exit 46, as shown. The outer cone wall 314 includes a barrier wall portion 318 that engages an end of the splash plate 90 and the basket liner 54. Another design change includes providing an extended spacer ring 320 mounted to an outside surface of the basket liner 54 at the basket exit 46, where the spring clip 84 is secured to an outside surface of the spacer ring 320, as shown. The spacer ring 320 includes outer walls 322 that define an enclosure and inner walls 324 that define a series of parallel flow channels 326 within the enclosure. Cooling air flowing between the spring clip 84 and the basket liner 54 flows into and through the flow channels 326. In an alternate embodiment, the spring clip 84 can be secured to the basket liner 54 farther up or down stream from the position shown, where the spacer ring 320 can be eliminated.

A series of spaced apart pairs of adjacent feed holes 330 and 332 are formed through the bottom wall of the spacer ring 320 and are aligned with cooperating feed holes (not shown) in the basket liner 54. The feed holes 330 and 332 are positioned on opposite sides of the barrier wall portion 318 of the outer exit cone wall 314, where the holes 330 are in fluid communication with the channel 316 between the exit cone walls 312 and 314, but not the channel 92, and the holes 332 are in fluid communication with the channel 92, but not the channel 316. The holes 330 and 332 are properly metered, i.e., have a certain relative size, so that the desired amount of cooling air is provided to the exit cone 310 and the desired amount of cooling air provided to the splash plate 90, where the barrier wall portion 318 prevents the cooling air from combining. Thus, in this design, an outer surface of the exit cone wall 314 and an inner surface of the exit cone wall 312 that are not exposed to the cooling air have a thermal barrier coating 334 and 336, respectively, that helps prevent those components from being burned by the hot working gas.

Another design technique for improved thermal management of the combustor 14 is described in International Patent Application No. PCT/US2014/048795, titled "MULTIPLE FEED PLATEFINS WITHIN A HOT GAS PATH COOLING SYSTEM IN A COMBUSTOR BASKET IN A COMBUSTION TURBINE ENGINE", filed Jul. 30, 2014, assigned to the assignee of the present application.

Traditionally, platefins are used within combustor baskets to provide a cooling mechanism for the walls forming the combustor basket by keeping component temperatures low, thereby preventing premature failure of the combustor basket before scheduled maintenance. Traditional platefins are fed with shell air at an upstream end of the platefin. As the air flows through the fins, it removes heat from the platefin and the air heats up, becoming less and less effective at cooling. In addition, the leading edge of the platefin experiences some film cooling from the exiting air from the upstream platefin, but this benefit only lasts for a finite distance as the air is exposed to the hot gases, which causes the air to heat up. This increase in temperature of the cooling air contributes to a higher part temperature in the downstream section of the platefin which limits the physical length and operational life of the platefin.

Set forth below is a brief summary of the invention that solves the foregoing problems and provides benefits and advantages in accordance with the purposes of the present invention as embodied and broadly described herein. A hot gas path cooling system for a combustor of a gas turbine engine, whereby the cooling system is positioned in a combustor basket is disclosed. The cooling system may include a platefin cooling system formed from a platefin member positioned radially inward from an outer wall forming a combustor basket. At least first and second cooling circuits may be formed between the platefin member and the combustor basket and may be separated from each other by a first rib section. The second cooling circuit, thus, may be positioned downstream from the first cooling circuit and may receive fresh cooling fluid through one or more inlets, not from the first cooling circuit. As such, the downstream second cooling circuit may be cooled similarly to the first cooling circuit.

In at least one embodiment, the hot gas path cooling system for a combustor of a gas turbine engine may include a combustor basket formed from at least one outer wall defining a combustor chamber. The hot gas path cooling system may include one or more platefin cooling systems formed from a platefin member positioned radially inward from an inner surface of the outer wall forming the combustor basket. One or more first rib sections may extend between the platefin member and the combustor basket, thereby separating a first cooling circuit from a second cooling circuit, whereby the first cooling circuit is upstream from the second cooling circuit. The cooling circuit may include one or more first exhaust outlets positioned in the platefin member upstream from the first rib section. The second cooling circuit may include one or more second exhaust outlets positioned downstream from the first rib section.

The platefin cooling system may include one or more first cooling circuit inlets positioned upstream from the first outlet. The first cooling circuit inlet may extend radially outward through the inner surface of the outer wall defining a least a portion of the first cooling circuit. The first cooling circuit inlet may be formed from a plurality of orifices positioned circumferentially about the outer wall of the combustor basket. In at least one embodiment, the first cooling circuit inlet may be formed from a plurality of orifices positioned circumferentially about the outer wall of the combustor basket. The platefin cooling system may also include a second cooling circuit inlet positioned upstream from the second outlet in the second cooling circuit. The second cooling circuit inlet may extend radially outward through the inner surface of the outer wall defining a least a portion of the second cooling circuit. The second cooling circuit inlet may be formed from a plurality of orifices positioned circumferentially about the outer wall of the combustor basket. In at least one embodiment, the platefin member may be generally cylindrical.

In at least one embodiment, a radially extending opening of the first cooling circuit may be equal to a radially extending opening of the second cooling circuit. The first outlet of the first cooling circuit may be positioned immediately upstream from the first rib section and within a distance of the first rib section that is less than a diameter of the first outlet. A combustor cooling system may have one or more combustor cooling system outlets configured to emit cooling fluid into the combustor chamber. The combustor cooling system outlet may be positioned radially inward from the platefin member.

In at least one embodiment, the hot gas path cooling system may include a plurality of cooling circuits and in particular may include three or more cooling circuits. In such embodiment, the second rib section may extend between the platefin member and the combustor basket, thereby separating the second cooling circuit from a third cooling circuit. The second cooling circuit may be upstream from the third cooling circuit. The second cooling circuit may include at least one second outlet positioned in the platefin member upstream from the second rib section. The third cooling circuit may include one or more third outlets positioned downstream from the second rib section. A third cooling circuit inlet may be positioned upstream from the third outlet in the third cooling circuit. The third cooling circuit inlet may extend radially outward through the inner surface of the outer wall defining a least a portion of the third cooling circuit.

During use, the combustor contains a combustion flame within the combustor basket and produces a hot gas that flows downstream from the combustor basket into the transition. Cooling air flows into the hot gas path cooling system to cool aspects of the combustor basket and the transition to prolong the life of the components forming the combustor basket and the transition. The cooling air may be supplied by one or more sources, including, but not limited to, compressed air, such as from the compressor, compressor bleed air, or other appropriate sources. The cooling air may be supplied to the platefin cooling system where the cooling fluids enter the first cooling circuit via the one or more first cooling circuit inlets. The cooling air pulls heat from the platefin member and increases in temperature. The cooling air is discharged from the platefin cooling system via the one or more first outlets after flowing through a portion of the platefin cooling system. Simultaneously, cooling air may flow into the second cooling circuit via the one or more second cooling circuit inlets. The cooling air pulls heat from the platefin member and increases in temperature. The cooling air is discharged from the platefin cooling system via the one or more second outlets after flowing through a portion of the platefin cooling system downstream from the first cooling circuit. By dividing the platefin cooling system into multiple cooling circuits, fresh cooling air is able to be supplied to downstream aspects of the platefin cooling system to provide enhanced cooling to those regions in comparison to single chamber cooling systems. Cooling air may also flow into the combustor cooling system and be emitted from the one or more combustor cooling system outlets. The cooling air flowing from the combustor cooling system outlets may cool the surfaces of the platefin member and the transition housing that are exposed to the hot gas path.

An advantage of the platefin cooling system is that the platefin cooling system maintains a more consistent temperature gradient across its length extending downstream in comparison to conventional single entry point systems.

Another advantage of the platefin cooling system is that the platefin cooling system is configured such that once cooling air has been heated to a design temperature, the cooling air is exhausted from the system and fresh cooling air is used to cool aspects of the platefin cooling system downstream thereof. The cooling air exhausted, even though heated, is still cooler than the combustion gases and provides come film cooling for the downstream section, unlike what is found in a conventional single feed system wherein the downstream section does not receive any film cooling air that hasn't been heated beyond an effective temperature.

These and other advantages and objects will become apparent upon review of the detailed description of the invention set forth below.

Figure 20:
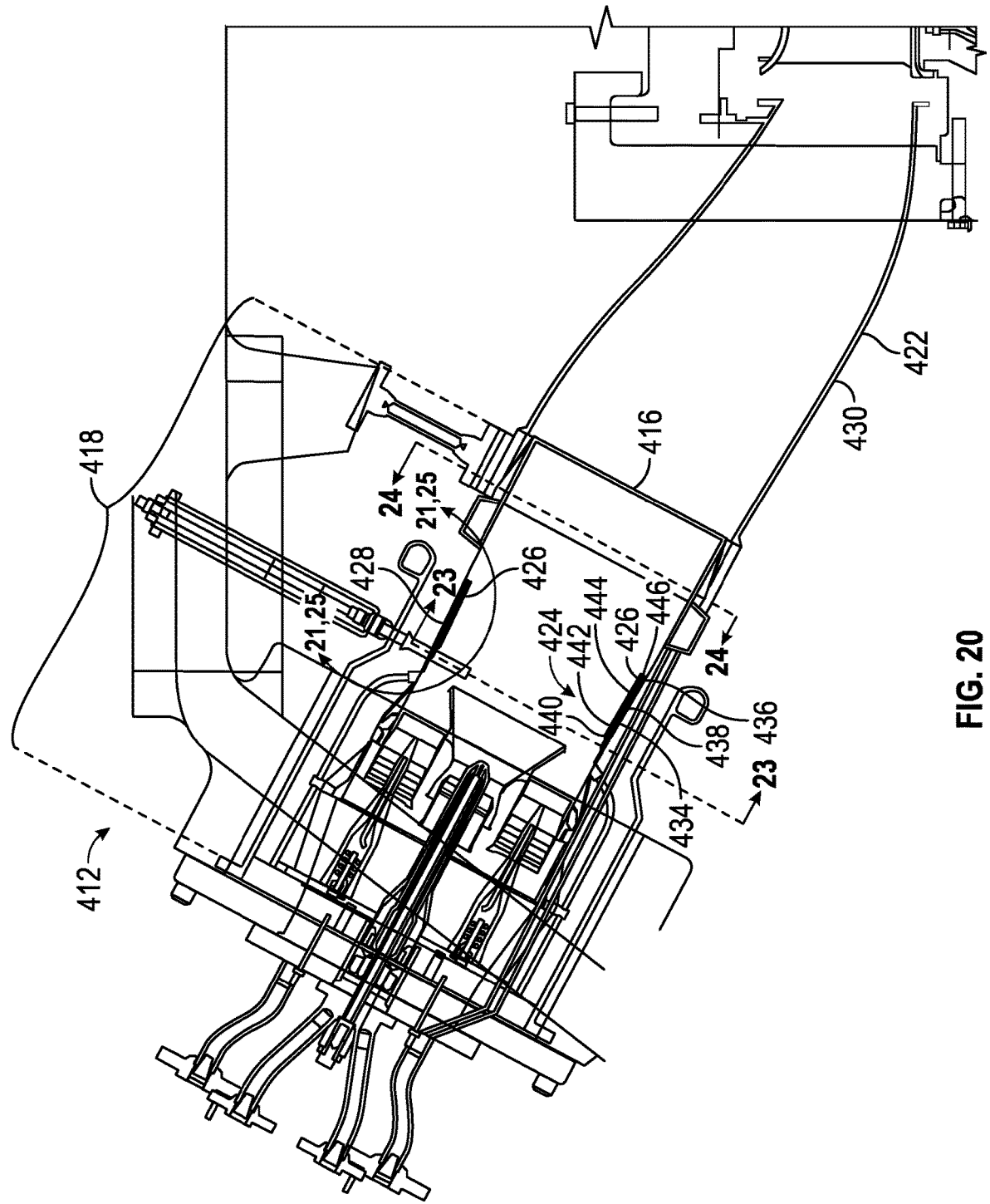
FIG. 20 is a cross-sectional side view of one design of a combustor which may be used in the turbine engine shown in FIG. 19, along with the hot gas path cooling system taken at detail line 20-20 in FIG. 19.
Figure 21:
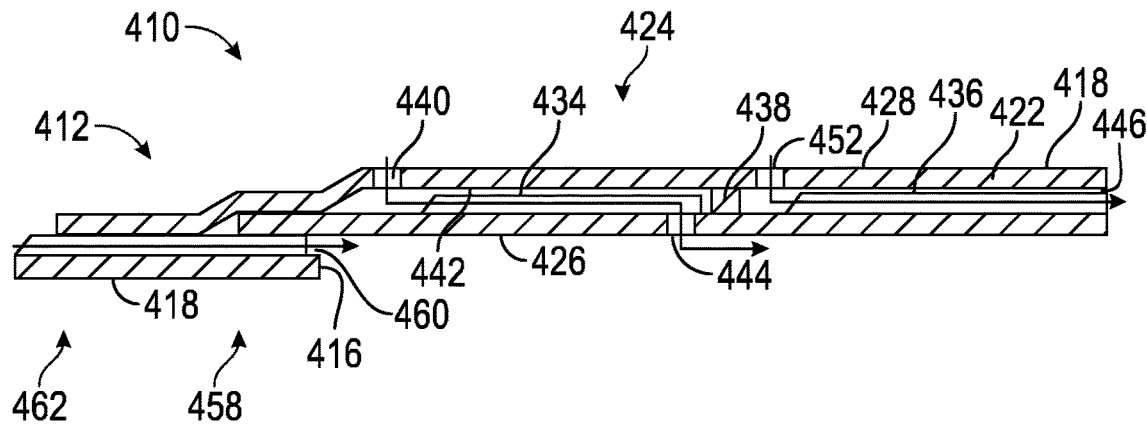
FIG. 21 is a partial, detailed, cross-sectional side view of the hot gas path cooling system including the platefin cooling system and the combustor cooling system taken at detail line 21-21 in FIG. 20.
Figure 22:
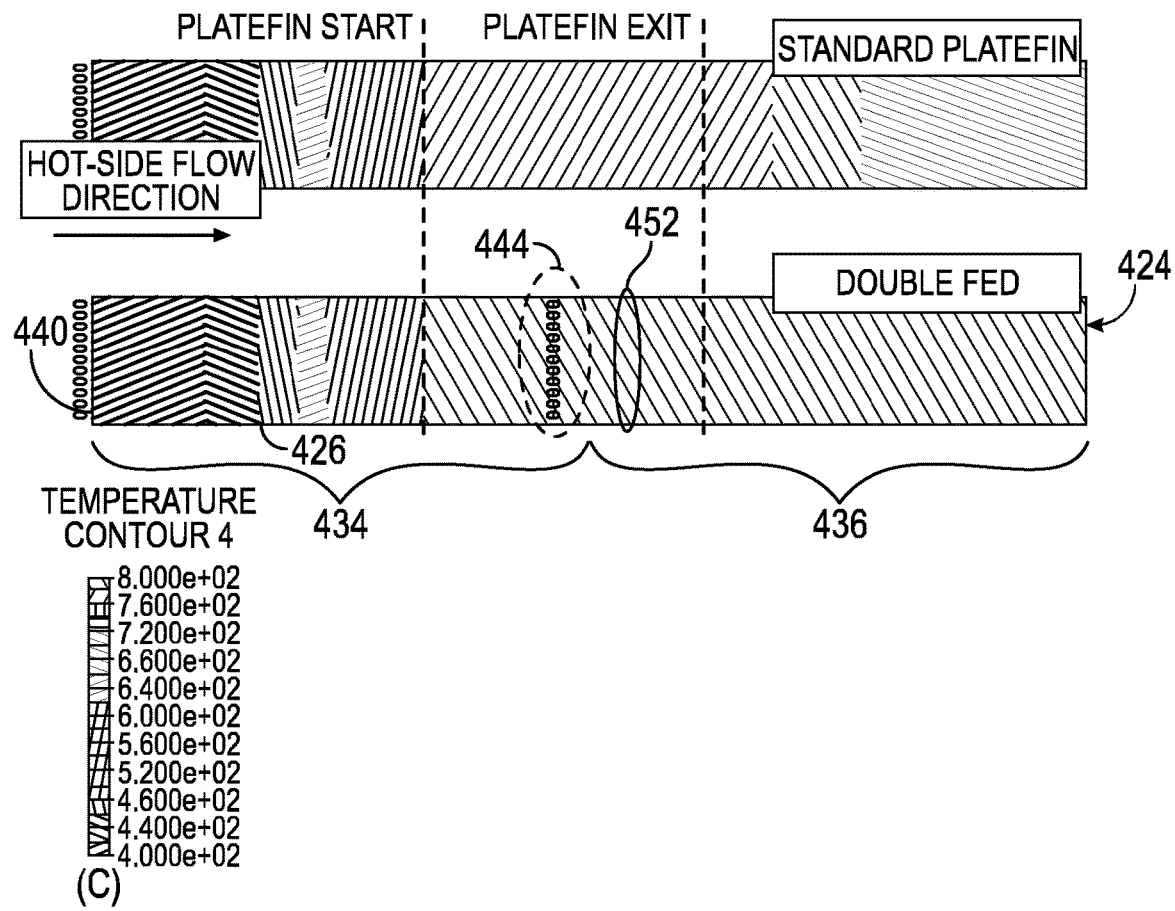
FIG. 22 is a graph of the temperature of a platefin member with the platefin cooling system compared to a platefin member with only a single cooling circuit.
Figure 23:
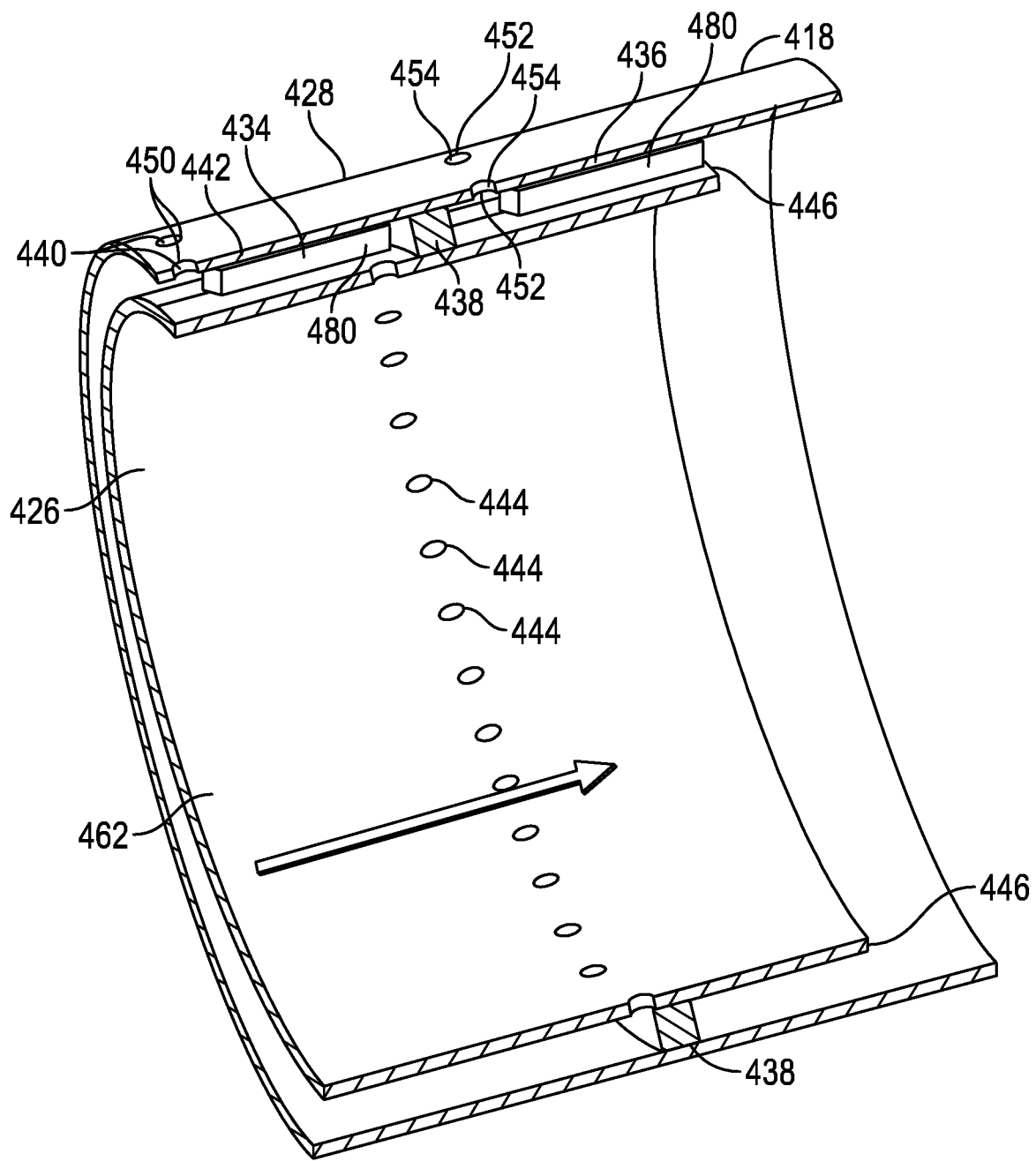
FIG. 23 is a partial, cross-sectional, perspective view of the platefin cooling system taken at section line 23-23 in FIG. 20.
Figure 24:
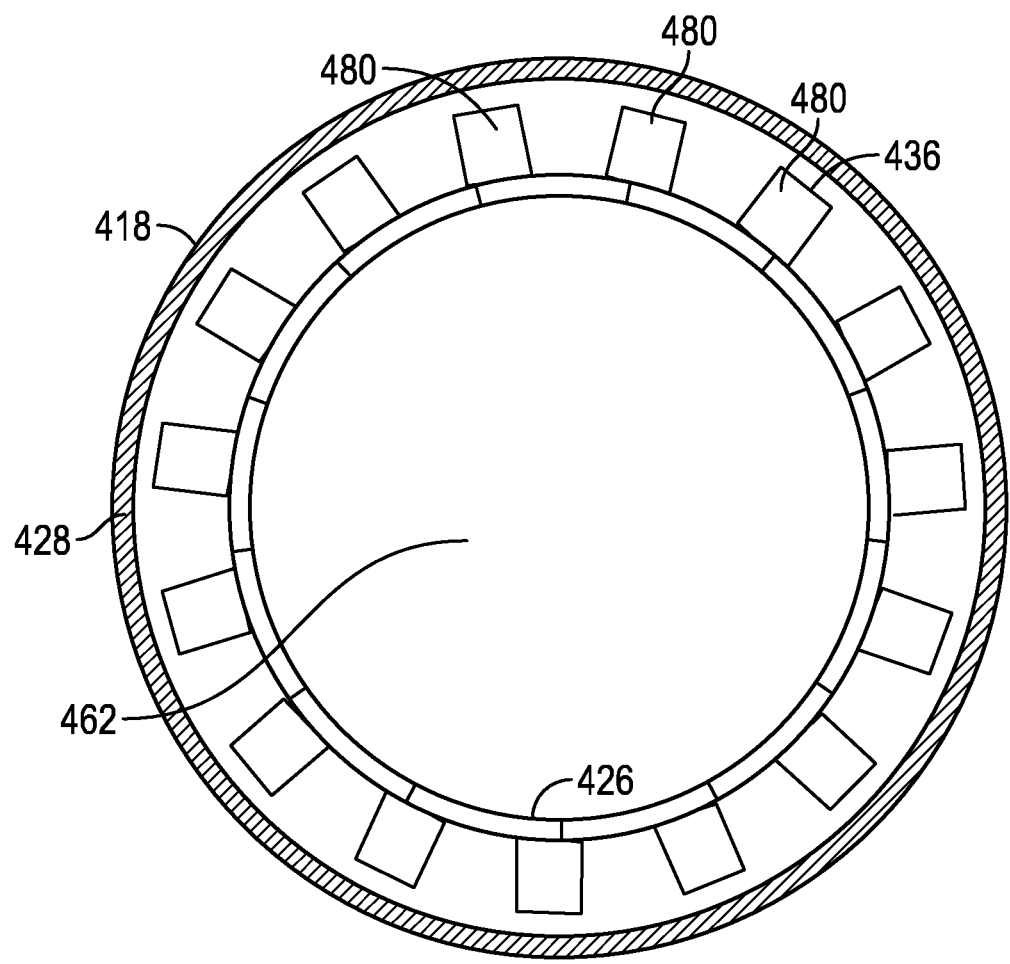
FIG. 24 is an end view facing upstream of the platefin cooling system at section line 24-24 in FIG. 20.

As shown in FIGS. 19-25, a hot gas path cooling system 410 for a combustor 412 of a gas turbine engine 414, whereby the cooling system 410 is positioned within a combustor basket 418 is disclosed. The cooling system 410 may include a platefin cooling system 424 formed from a platefin member 426, as shown in FIGS. 21, 23 and 24, positioned radially inward from an outer wall 428 forming a combustor basket 418. At least first and second cooling circuits 434, 436 may be formed between the platefin member 426 and the combustor basket 418 and may be separated from each other by a first rib section 438. The second cooling circuit 436, thus, may be positioned downstream from the first cooling circuit 434 and may receive fresh cooling fluid through one or more inlets 440, not from the first cooling circuit 434. As such, the downstream second cooling circuit 436 may be cooled similarly to the first cooling circuit 434.

In at least one embodiment, the hot gas path cooling system 410 may be configured to cool aspects of a combustor 412, such as, but not limited to, a transition housing 430 or portions of a combustor basket 418, or both. As shown in FIG. 20, the transition housing 430 form a transition 422 extending downstream from a downstream end 416 of a combustor basket 418. The transition housing 430 may be formed from one or more outer walls 428. In at least one embodiment, the transition housing 430 may be cylindrical as shown in FIGS. 23 and 24, and in other embodiments, may have other shapes. The transition housing 430 may be formed from any appropriate material capable of withstanding the heat found within the hot gases in the hot gas path defined by the combustor basket 418 and the transition housing 430.

The combustor basket 418 may be formed from one or more outer walls 428. In at least one embodiment, the combustor basket 418 may be cylindrical as shown in FIGS. 23 and 24, and in other embodiments, may have other shapes. The combustor basket 418 may be formed from any appropriate material capable of withstanding the heat found within the hot gases in the hot gas path defined by the combustor basket 418 and the transition housing 430.

As shown in FIG. 21, one or more platefin cooling systems 424 may be formed from a platefin member 426 positioned radially inward from an inner surface 442 of the one or more outer walls 428 forming the combustor basket 418. The platefin member 426 may be configured to have a shape that maintains a consistent radial thickness of the cooling circuits, such as, but not limited to, the first and second cooling circuits 434, 436. In other words, a radially extending opening of the first cooling circuit 434 may be equal to a radially extending opening of the second cooling circuit 436. As such, in at least one embodiment, the platefin member 426 may be shaped substantially similar to the combustor basket 418. Thus, in embodiments where the combustor basket 418 is generally cylindrical, the platefin member 426 may be generally cylindrical as well, as shown in FIGS. 23 and 24. In other embodiment, a radial thickness of the cooling circuits, such as, but not limited to, one of the first and second cooling circuits 434, 436, or both may vary. Furthermore, the platefin member 426 may have a different configuration than the combustor basket 418. The platefin member 426 may be formed from any appropriate material capable of withstanding the heat found within the hot gases in the hot gas path defined by the combustor basket 418 and the combustor basket 418. As shown in FIGS. 23 and 24, one or more fins 480 may extend radially outward from the platefin member 426. The fins 480 may have any appropriate shape. The fins 480 may be positioned circumferentially between exhaust outlets 444 positioned in the platefin member 426 so as to not block the exhaust outlets 444. The fins 480 enhance the efficiency of the hot gas path cooling system 410.

In at least one embodiment, the first and second cooling circuits 434, 436 may be separated by one or more first rib sections 438 extending between the platefin member 426 and the combustor basket 418. The first rib section 438 may have any appropriate thickness, width and length. In at least one embodiment, the first rib sections 438 may be positioned halfway along a length of the platefin member 426. In other embodiments, the first rib section 438 may be positioned in other positions along the length of the platefin member 426. The first cooling circuit 434 may be positioned upstream from the second cooling circuit 436. The first cooling circuit 434 may be equal in size to the second cooling circuit 436 or may be differently sized. The first cooling circuit 434 may include one or more first outlets 444 positioned in the platefin member 426 upstream from the first rib section 438. The second cooling circuit 436 may include one or more second outlets 446 positioned downstream from the first rib section 438. A first cooling circuit inlet 440 may be positioned upstream from the first outlet 444. The first cooling circuit inlet 440 may extend radially outward through the inner surface 442 of the outer wall 428 defining a least a portion of the first cooling circuit 434. The first cooling circuit inlet 440 may be formed from a plurality of orifices 450 positioned circumferentially about the outer wall 428 of the combustor basket 418. In at least one embodiment, the first cooling circuit inlet 440 may be formed from a plurality of slots, a continuous, circumferentially extending slot or orifice or other configuration.

One or more second cooling circuit inlets 452 may be positioned upstream from the second outlet 446 in the second cooling circuit 436. The second cooling circuit inlet 452 may extend radially outward through the inner surface 442 of the outer wall 428 defining a least a portion of the second cooling circuit 436. The second cooling circuit inlet 452 may be formed from a plurality of orifices 454 positioned circumferentially about the outer wall 428 of the combustor basket 418. The second cooling circuit inlet 452 may be formed from a plurality of orifices 454 positioned circumferentially about the outer wall 428 of the combustor basket 418. In at least one embodiment, the second cooling circuit inlet 452 may be formed from a plurality of slots, a continuous, circumferentially extending slot or orifice or other configuration.

In at least one embodiment, the first outlet 444 of the first cooling circuit 434 may be positioned immediately upstream from the first rib section 438. The first outlet 444 of the first cooling circuit 434 may be positioned within a distance of the first rib section 438 that is less than a diameter of the first outlet 444. In other embodiments, the first outlet 444 of the first cooling circuit 434 may be positioned further upstream from the first rib section 438 or may be positioned closer to the first rib section 438. Similarly, the second outlet 446 of the second cooling circuit 436 may be positioned immediately upstream from a second rib section 456 or may be positioned at a downstream end of the platefin member 426. In embodiments including the second rib section 456, the second outlet 446 of the second cooling circuit 436 may be positioned within a distance of the second rib section 456 that is less than a diameter of the second outlet 446. In other embodiments, the second outlet 446 of the second cooling circuit 436 may be positioned further upstream from the second rib section 456 or may be positioned closer to the second rib section 456.

The hot gas path cooling system 410 may also include a combustor cooling system 458 having one or more combustor cooling system outlets 460 configured to introduce cooling fluid into a combustor chamber 462 defined, at least in part, by the combustor basket 418 and the platefin member 426. The combustor cooling system outlet 460 may be formed from one or more orifices, slots or other appropriate components. In at least one embodiment, the combustor cooling system outlet 460 may be generally cylindrical as shown in FIGS. 23 and 24. One or more of the combustor cooling system outlets 460 may be positioned components forming the combustor basket 418. In at least one embodiment, the transition 422 may be positioned radially outward from the downstream end 416 of the combustor basket 418. The combustor cooling system outlet 460 may be positioned radially inward from the platefin member 426.

Figure 25:
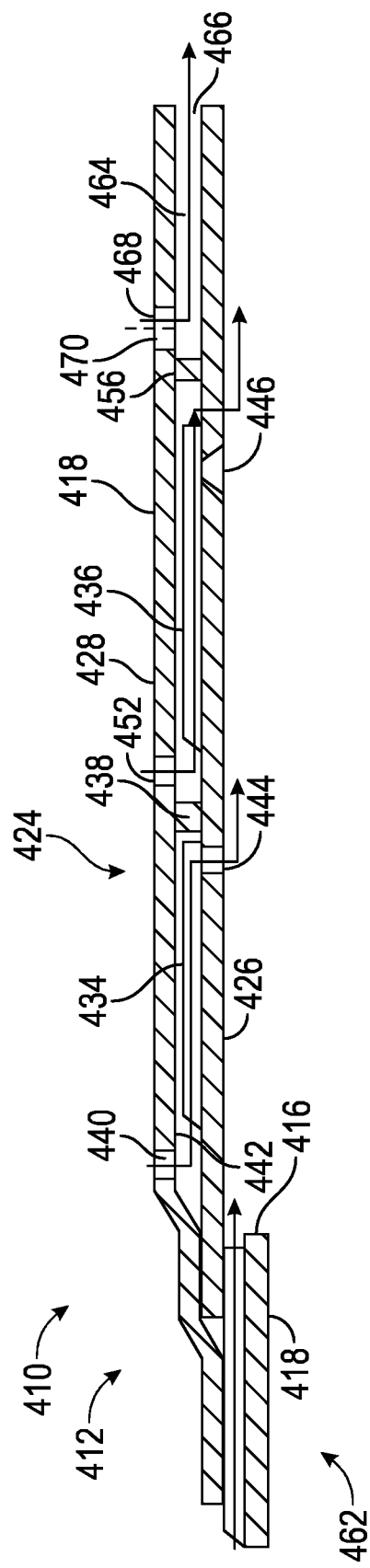
FIG. 25 is a partial cross-sectional side view of an alternative embodiment of the hot gas path cooling system including the platefin cooling system and the combustor cooling system taken at detail line 25-25 in FIG. 20.

In at least one embodiment, the hot gas path cooling system 410 may include a plurality of cooling circuits and in particular may include three or more cooling circuits. For example, as shown in FIG. 25, the hot gas path cooling system 410 may include a third cooling circuit 464 positioned downstream from the second cooling circuit 436. The second rib section 456 may extend between the platefin member 426 and the combustor basket 418, thereby separating the second cooling circuit 436 from the third cooling circuit 464. The second cooling circuit 436 may be upstream from the third cooling circuit 464, and the second cooling circuit 436 may include one or more second outlets 446 positioned in the platefin member 426 upstream from the second rib section 456. The third cooling circuit 464 may include one or more third outlets 466 positioned downstream from the second rib section 456. A third cooling circuit inlet 468 may be positioned upstream from the third outlet 466 in the third cooling circuit 464. The third cooling circuit inlet 468 may extend radially outward through the inner surface 442 of the outer wall 428 defining a least a portion of the third cooling circuit 464. The first cooling circuit inlet 468 may be formed from a plurality of orifices 470 positioned circumferentially about the outer wall 428 of the combustor basket 418. The components forming the third cooling circuit inlet 468 may include the other aspects of the first and second cooling circuits 434, 436 described above.

During use, the combustor 412 contains a combustion flame within the combustor basket 418 and produces hot gases that flow downstream from the combustor basket 418 into the transition 422. Cooling air flows into the hot gas path cooling system 410 to cool aspects of the combustor basket 418 and the transition 422 to prolong the life of the components forming the combustor basket 418 and the transition 422. The cooling air may be supplied by one or more sources, including, but not limited to, compressed air, such as from the compressor, compressor bleed air, or other appropriate sources. The cooling air may be supplied to the platefin cooling system 424 where the cooling fluids enter the first cooling circuit 434 via the one or more first cooling circuit inlets 440. The cooling air pulls heat from the platefin member 426 and increases in temperature. The cooling air is discharged from the platefin cooling system 424 via the one or more first outlets 444 after flowing through a portion of the platefin cooling system 424. Simultaneously, cooling air may flow into the second cooling circuit 436 via the one or more second cooling circuit inlets 452. The cooling air pulls heat from the platefin member 426 and increases in temperature. The cooling air is discharged from the platefin cooling system 424 via the one or more second outlets 446 after flowing through a portion of the platefin cooling system 424 downstream from the first cooling circuit 434. By dividing the platefin cooling system 424 into multiple cooling circuits, fresh cooling air is able to be supplied to downstream aspects of the platefin cooling system 424 to provide enhanced cooling to those regions in comparison to single chamber cooling systems. Cooling air may also flow into the combustor cooling system 458 and be emitted from the one or more combustor cooling system outlets 460. The cooling air flowing from the combustor cooling system outlets 460 may cool the surfaces of the platefin member 426 and the combustor basket 418 that are exposed to the hot gas path.

Continuous and reliable combustion is another important consideration in turbine combustors. Cross flame ignition ducts can be used to communicate between combustors, allowing re-establishment of combustion in any combustor that experiences a flame-out. A design for an improved cross flame duct is described in International Patent Application No. PCT/US2014/054173, titled "CROSS IGNITION FLAME DUCT", filed Sep. 5, 2014, assigned to the assignee of the present application.

A gas turbine combustion section typically includes a plurality of circumferentially arranged combustors within a combustor shell and surrounding a turbine rotor. At start-up, ignition is established in the fuel/air mixtures of certain combustors that include igniters, thereby creating a flame. As certain combustors may not include igniters, cross-flame tubes are used to connect the combustors. The cross-flame tubes carry the flame from combustor to combustor around the combustor array until a flame has been established in all of the combustors. Flame detectors in the combustors opposite those with igniters may be used to verify that a flame has been established in each combustor. During operation, the cross-flame tubes act to re-establish combustion in any combustor that may experience a flame-out.

Traditionally, the cross-flame tubes were formed from a flexible metal hose having flanges at each end. The flexible material may be used to compensate for assembly tolerances and a sliding fit between components of the tube may be designed to accommodate differential thermal growth. These designs however are susceptible to thermal and mechanical stresses that result in component fatigue and operational failures. It is therefore desirable to provide an improved cross-flame tube that addresses the thermal and mechanical limitations of prior art designs.

A cross-flame duct for connecting adjacent combustors together in a gas turbine to guard against flameout conditions within the combustors, whereby the cross-flame duct may include first and second ducts forming a slip joint to prevent stress from developing within the cross-flame duct is disclosed. The cross-flame duct remains flexible during turbine operation due to the slip joint, thereby preventing damaging thermal and mechanical stresses from developing within the cross-flame duct and enhancing the useful life of the cross-flame duct and associated components. The first and second ducts may also include cooling chambers positioned between outer sleeves and inner housings and maintained with one or more standoffs to reduce thermal stress and gradients or prevent material loss due to overheating or burning. The cooling chambers may be supplied with cooling fluids via one or more fluid ports extending through the outer sleeves enabling air to flow through the cooling chambers and into the combustors.

In at least one embodiment, the cross-flame duct for connecting adjacent combustors in a gas turbine engine may be formed from a first duct extending along a longitudinal axis and configured to be coupled to a first combustor. The first duct may be formed from a first outer sleeve having a first end configured to be coupled to the first combustor and a second end on an opposite end from the first end. The first duct may also include a first inner housing positioned within the first outer sleeve and having a first end adjacent the first combustor and a second end extending from the second end of the first outer sleeve. A first cooling chamber may be positioned between an outer surface of the first inner housing and an inner surface of the first outer sleeve. The cross-flame duct may also be include a second duct extending along the longitudinal axis and configured to be coupled to a second combustor, wherein the second duct is configured to slidably receive the first duct. The second duct may include a second outer sleeve having a first end configured to be coupled to the second combustor and extending toward the first duct to slidably receive the second end of the first inner housing within a second end of the second outer sleeve. The second duct may include a second inner housing positioned within the second outer sleeve and having a first end adjacent the second combustor and a second end extending toward the second end of the second outer sleeve. The second duct may also include a second cooling chamber positioned between an outer surface of the second inner housing and an inner surface of the second outer sleeve.

A first standoff may be positioned between the outer surface of the first inner housing and the inner surface of the first outer sleeve to maintain the first cooling chamber, and a second standoff may be positioned between the outer surface of the second inner housing and the inner surface of the second outer sleeve to maintain the second cooling chamber. A first fluid port may be positioned in the first outer sleeve adjacent to the first standoff to allow fluid to flow between the first cooling chamber and an environment exterior to the first outer sleeve. A second fluid port may be positioned in the second outer sleeve adjacent to the second standoff to allow fluid to flow between the second cooling chamber and an environment exterior to the second outer sleeve.

In at least one embodiment, a third cooling chamber may be positioned between the outer surface of the first inner housing and the inner surface of the second outer sleeve, and a third standoff may be positioned between the outer surface of the first inner housing and the inner surface of the second outer sleeve. The third standoff may separate the second outer sleeve from the first inner housing to maintain and enable the first duct to slides relative to the second duct. In at least one embodiment, the third standoff may be formed from a plurality radially projecting dimples configured to slidably engage an adjacent surface.

The first outer sleeve may be formed from a first flange positioned at the first end of the first outer sleeve, and the second outer sleeve may include a second flange positioned at the second end of the second outer sleeve. The first flange may be configured to be coupled to a first combustor flange of the first combustor and the second flange may be to be coupled to a second combustor flange of the second combustor. The first flange may have an outer diameter that is less than an outer diameter of the first combustor flange. The first end of the first inner housing may extend along the longitudinal axis toward the first combustor outwardly beyond the first end of the first outer sleeve.

The cross-flame duct may include one or more first standoffs positioned between the first inner housing and the first outer sleeve to maintain the first cooling chamber. The second standoff may be positioned between the second inner housing and the second outer sleeve to maintain the second cooling chamber and a third cooling chamber. The second cooling chamber may extend between the first end of the second inner housing and the second standoff. The third cooling chamber may extend between the second end of the second inner housing and the second standoff.

In another embodiment, the cross-flame duct may include a first duct extending along a longitudinal axis and configured to be coupled to a first combustor. The first duct may include a first outer sleeve having a first end configured to be coupled to the first combustor and a second end on an opposite end from the first end. The first duct may also include a first inner housing positioned within the first outer sleeve and having a first end adjacent the first combustor and a second end on an opposite end from the first end. The first duct may include a first cooling chamber positioned between an outer surface of the first inner housing and an inner surface of the first outer sleeve. The cross-flame duct may include a second duct extending along the longitudinal axis and configured to be coupled to a second combustor. The second duct may be configured to slidably receive the first duct and may include a second outer sleeve having a first end configured to be coupled to the second combustor and extending toward the first duct to slidably receive the second end of the first inner housing within a second end of the second outer sleeve. The second duct may include a second inner housing positioned within the second outer sleeve and having a first end adjacent the second combustor and a second end on an opposite end from the first end. The second duct may include a second cooling chamber positioned between an outer surface of the second inner housing and an inner surface of the second outer sleeve.

The cross-flame duct may also include a third duct formed from a first end slidably coupled to the second end of the first duct and a second end slidably coupled to the second end of the second duct. The third duct may form a middle duct between the first and second ducts of the cross-flame duct.

The second end of the first outer sleeve may extend beyond the second end of the first inner housing and may be configured to receive the first end of the third duct. The second end of the second outer sleeve may extend beyond the second end of the second inner housing and may be configured to receive the second end of the third duct. A third cooling chamber may be positioned between an outer surface of the third duct and an inner surface of the first outer sleeve. A fourth cooling chamber may be positioned between the outer surface of the third duct and the inner surface of the second outer sleeve. A fluid port may be positioned in the third duct and in fluid communication with the third cooling chamber, thereby placing the third cooling chamber in fluid communication with an environment external to the third duct. A fluid port may also be positioned in the third duct and in fluid communication with the fourth cooling chamber, thereby placing the fourth cooling chamber in fluid communication with the environment external to the third duct.

A first standoff may be positioned between the outer surface of the first inner housing and the inner surface of the first outer sleeve to maintain the first cooling chamber. A second standoff may be positioned between the outer surface of the second inner housing and the inner surface of the second outer sleeve to maintain the second cooling chamber. The cross-flame duct may also include a third standoff and a fourth standoff. The third standoff may be positioned between the outer surface of the third duct and the inner surface of the first outer sleeve to maintain the third cooling chamber. The fourth standoff may be positioned between the outer surface of the third duct and the inner surface of the second outer sleeve to maintain the fourth cooling chamber. In at least one embodiment, the third standoff and the fourth standoff may each include a plurality of radially projecting dimples positioned at the first end and second end of the third duct.

The cross-flame duct may include a position control system for limiting movement of the third duct relative to the first and second ducts. The third duct may be floatable between the first and second ducts between a first longitudinal position and a second longitudinal position, whereby a length of the third cooling chamber taken along the longitudinal axis and a length of the fourth cooling chamber taken along the longitudinal axis increase and decrease as the third duct floats between the first and the second longitudinal positions. The first outer sleeve may include a first flange positioned at the first end of the first outer sleeve, and the second outer sleeve may include a second flange positioned at the first end of the second outer sleeve. The first flange may be configured to be coupled to a first combustor flange of the first combustor, and the second flange may be configured to be coupled to a second combustor flange of the second combustor. The first flange may have an outer diameter that is less than an outer diameter of the first combustor flange.

The cross-flame duct may include a first fluid port positioned in the first outer sleeve adjacent to the first standoff to allow fluid to flow into the first cooling chamber from an environment exterior to the first outer sleeve. A second fluid port may be positioned in the second outer sleeve adjacent to the second standoff to allow fluid to flow into the second cooling chamber from an environment exterior to the second outer sleeve. The first end of the third duct may be configured to receive the second end of the first outer sleeve, and the second end of the third duct may be configured to receive the second end of the second outer sleeve.

The cross-flame duct may include a first standoff positioned between the outer surface of the first inner housing and the inner surface of the first outer sleeve to maintain the first cooling chamber. A second standoff may be positioned between the outer surface of the second inner housing and the inner surface of the second outer sleeve to maintain the second cooling chamber. A third cooling chamber may be positioned between the third duct and the first outer sleeve with a third standoff positioned between an inner surface of the third duct and an outer surface of the first outer sleeve in the third cooling chamber to maintain the third cooling chamber. A fourth cooling chamber may be positioned between the third duct and the second outer sleeve with a fourth standoff positioned between the inner surface of the third duct and an outer surface of the second outer sleeve in the fourth cooling chamber to maintain the fourth cooling chamber. The third standoff may include a plurality of radially projecting dimples positioned within the third cooling chamber and a plurality of radially projecting ridges extending circumferentially within the third cooling chamber. Fluid ports may be positioned between the plurality of radially projecting ridges to provide a fluid pathway between the third cooling chamber and an environment exterior to the first outer sleeve.

These and other embodiments are described in more detail below.

As shown in FIGS. 26A-28, a cross-flame duct 600 for connecting adjacent combustors 501, 502, together in a gas turbine to guard against flameout conditions within the combustors 501, 502, whereby the cross-flame duct 600 may include first and second ducts 602, 606 forming a slip joint to prevent stress from developing within the cross-flame duct 600 is disclosed. The cross-flame duct 600 may remain flexible during turbine operation due to the slip joint, thereby preventing damaging thermal and mechanical stresses from developing within the cross-flame duct 600 and enhancing the useful life of the cross-flame duct 600 and associated components. The first and second ducts 602, 606 may also include cooling chambers 638, 656, 674 positioned between outer sleeves 622, 640 and inner housings 628, 646 and maintained with one or more standoffs 634, 652, 670 to reduce thermal stress and gradients or prevent material loss due to overheating or burning. The cooling chambers 638, 656, 674 may be supplied with cooling fluids via one or more fluid ports 676 extending through the outer sleeves 622, 640 enabling air to flow through the cooling chambers 638, 656, 674 and into the combustors 501, 502.

Figure 26A:
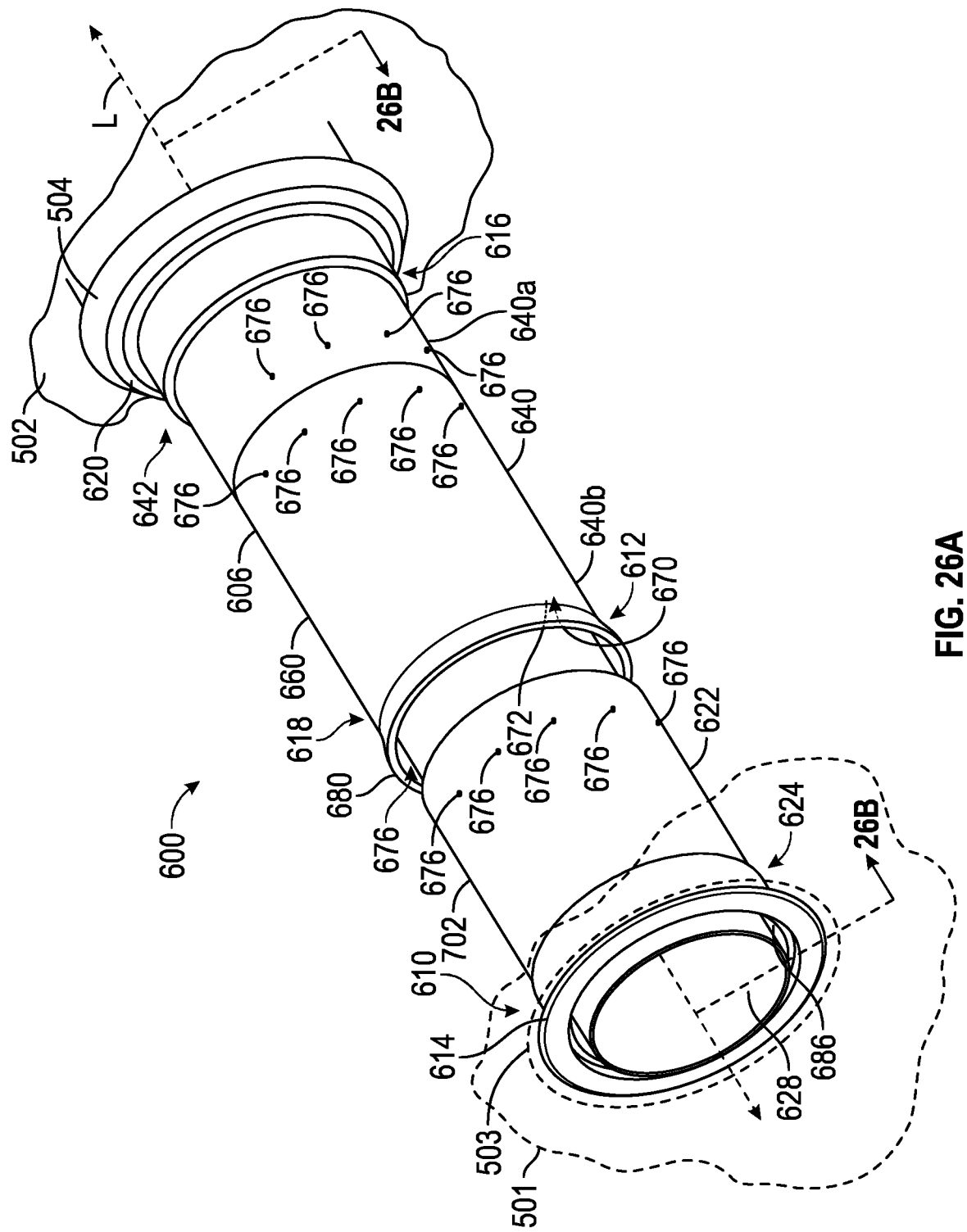
FIG. 26A is a perspective view of one embodiment of a cross-flame duct according to various embodiments described herein.
Figure 26B:
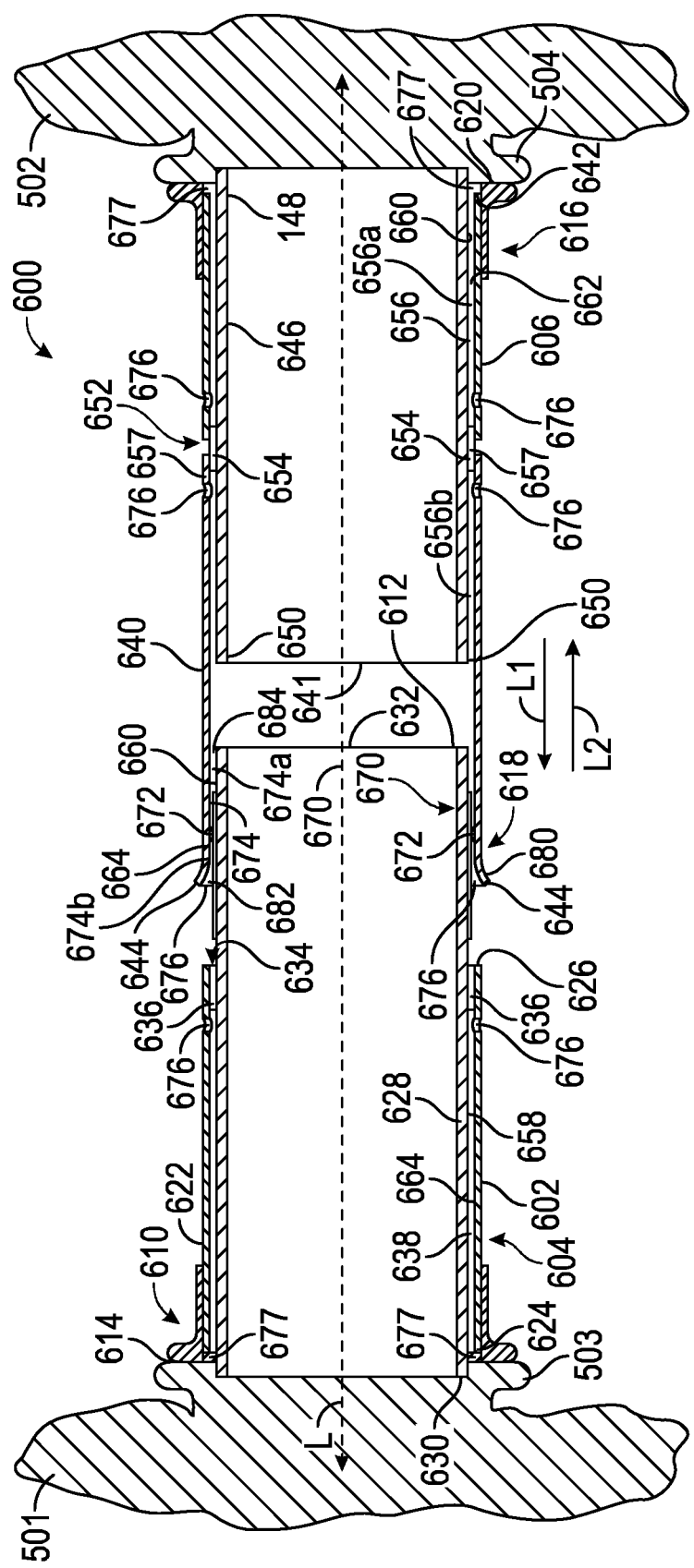
FIG. 26B is a longitudinal cross-section view of the cross-flame duct of FIG. 26A taken along section line 26B-26B of FIG. 26A.

In at least one embodiment, a cross-flame duct 600 may extend generally along a longitudinal axis L, as shown in FIGS. 26A and 26B. The cross-flame duct 600 may include a first duct 602 positioned at a first end 604 of the cross-flame duct 600 and a second duct 606 positioned at a second end 608 of the cross-flame duct 600. The first duct 602 may extend from a first end 610 to a second end 612. The first end 610 may be include a flange 614 for coupling the first end 604 of the cross-flame duct 600 to a first combustor 501 at a first combustor flange 503. The second duct 606 may extend from a first end 616 to a second end 618. The first end 616 may include a flange 620 for coupling the second end 608 of the cross-flame duct 600 to a second combustor 502 at a second combustor flange 504.

In one embodiment, one or both of the first and second flanges 614, 620 may be undersized with respect to a corresponding diameter of the combustor flange 503, 504 connection associated with the respective combustor 501, 502. The flange 614, 620 may allow the position of the cross-flame duct 600 with respect to the combustor flange 503, 504 to adjust for assembly tolerances. For example, the flange 614, 620 may be undersized with respect to an outer diameter of the respective combustor flange 503, 504 to allow the flanges 614, 620 to be repositioned within the outer diameter of the combustor flange 503, 504 to adjust for assembly tolerances. For example, ring-type compression clamps, e.g., "marmon" clamps, may be used to couple the respective flanges 614, 503, 620, 504. In at least one embodiment, a clamp or flange may be positioned over the outer diameters of the combustor flange 503, 504 and the flange 614, 620 of the cross-flame duct 600 to couple the respective flanges 614, 503, 620, 504 together.

In at least one embodiment, Interfacing areas of the outer sleeves 622, 640 and inner housings 628, 646 may be hard-face coated to minimize wear, and the inner housing ducts may include a thermal barrier coating (TBC) to protect against overheating. In various embodiments, the double wall configuration may enhance cooling efficiency compared to prior art systems. For example, the cross-flame duct 600 does not require use of a corrugated or other flex-type duct to compensate for assembly tolerances and other misalignment issues and may be formed form rigid components. Thus, whereas prior art designs require use of a flexible duct, such as a corrugated duct, between adjacent combustors to compensate for assembly tolerances, the cross-flame duct 600 is configured such that the first and second ends 660, 616 of the first and second ducts 602, 606 may be shifted up or down with respect to a respective combustor 501, 502 to enable the first and second ducts 602, 606 to operatively align when the combustors 501, 502 are axially misaligned. Such flexibility of the cross-flame duct 600 may be accomplished, at least, by the flanges 614, 620 of the cross-flame duct 600 being undersized relative to combustor flanges 503, 504 in which the flanges 614, 620 are to be coupled to compensate for assembly tolerances.

The cross-flame duct 600 may have any appropriate cross-sectional shape, such as, but not limited to, cylindrical, rectangular, square, triangular, and other multi or single sided configurations. In at least one embodiment, the cross-flame duct 600 may have a cylindrical configuration extending along the longitudinal axis L and may include an axial cross-section having an arcuate perimeter or circumference. In other embodiments, other arcuate or non-arcuate configurations may be used without departing from the beneficial features described here. For example, in one embodiment, a cross-flame duct 600 may includes an axial cross-section defining a multi-sided perimeter. The sides may include straight, curved or have other shapes.

In at least one embodiment, the first and second ducts 602, 606 may include modular components configured to interface or mate to form the cross-flame duct 600. For example, the first duct 602 may include a female end configured to receive a male end of the second duct 606. As described in more detail below, the first and second ducts 602, 606 may each include one or more subcomponents configured to form a double wall configuration along at least a portion of a length of each duct 602, 606. The various subcomponents of each of the first and second ducts 602, 606 may be coupled together with little, if any, risk of separation when the cross-flame duct 600 is assembled or installed for use. The double wall configuration provides a cooling system that regulates the temperature of the cross-flame duct 600 to reduce thermal stress and thermal gradients. Regulation of the temperature of the cross-flame duct 600 using the cooling system provided by the double wall configuration may also prevent material loss due to overheating or burning.

The first duct 602 and the second duct 606 may be configured to mate at their second ends 612, 618 to form a slip joint between the first and second ducts 602, 606. For example, as shown in FIGS. 26A and 26B, the second end 612 of the first duct 602 may include a male mating portion extending toward the second duct 606, and the second end 618 of the second duct 606 may include a female mating portion extending toward the first duct 602 and configured to receive the male mating portion of the first duct 602 therein. The second end 612 of the first duct 602 may have an outer diameter that is less than an inner diameter of the second end 618 of the second duct 606. To form the slip joint, the second end 612 of the first duct 602 may be received within the inner diameter or circumference of the second end 618 of the second duct 606. When mated, the first duct 602 and the second duct 606 may be relatively movable via longitudinal sliding along the slip joint. The longitudinal sliding may allow the cross-flame duct 600 to compensate for thermal expansion.

The first duct 602 may include a first outer sleeve 622 having a first end 624 and a second end 626 and a first inner housing 628 having a first end 630 and a second end 632. The first inner housing 628 may have an outer diameter that is less than an inner diameter of the first outer sleeve 622. A first cooling chamber 638 may be positioned between the first outer sleeve 622 and the first inner housing 628. The first cooling chamber 638 may include one or more fluid ports 676 forming cooling fluid inlets and one or more outlets 677 exhausting the cooling fluid into the combustor 501 for combustion. The first cross-flame duct 600 may include one or more standoffs 634 positioned between the first inner housing 628 and the first outer sleeve 622 to maintain the position of the first inner housing 628 within the first outer sleeve 622 and to maintain the first cooling chamber 638. In at least one embodiment, the standoff 634 may be formed from one or more spacers 636 that assist in forming the first cooling chamber 638 defined between the first inner housing 628 and the first outer sleeve 622. The standoff 634 may be a fixed standoff 634 including one or more fixed spacers 636 with respect to the first inner housing 628 and first outer sleeve 622.

The second duct 606 may include a second outer sleeve 640 having a first end 642 and a second end 644 and a second inner housing 646 having a first end 648 and a second end 650. The second inner housing 646 may include an outer diameter that is less than an inner diameter of the second outer sleeve 640. A second cooling chamber 656 may be positioned between the second outer sleeve 640 and the second inner housing 646. The second cooling chamber 656 may include one or more fluid ports 676 forming cooling fluid inlets and one or more outlets 677 exhausting the cooling fluid into the combustor 502 for combustion. The second cross-flame duct 600 may include one or more standoffs 652 positioned between the second inner housing 646 and the second outer sleeve 640 to maintain the position of the second inner housing 646 within the second outer sleeve 640 and to maintain the second cooling chamber 656. In at least one embodiment, the standoff 652 may be formed from one or more spacers 654 configured to maintain the second cooling chamber 656 defined between the second inner housing 646 and the second outer sleeve 640. The standoff 652 may be formed from a fixed standoff 652 including one or more fixed spacers 654 with respect to the second inner housing 646 and second outer sleeve 640.

As described below, the standoffs 634, 654, may be, but are not limited to being, rings or dimples, and may be function as a spacer that ensures a consistent space is maintained between the outer sleeves 622, 640 and inner housings 628, 646 for even cooling. In at least one embodiment, the standoffs 634, 654 may be used to position the inner housings 628, 646 concentrically within the outer sleeves 622, 640. In other embodiments, the standoffs 634, 654 may position the inner housings 628, 646 eccentrically within the outer sleeves 622, 640.

In various embodiments, the fixed spacers 636, 654 may include attachment points between either the first inner housing 628 and the first outer sleeve 622 or between the second inner housing 646 and second outer sleeve 640. Such spacers 636, 654 may include, but are not limited to, radially extending projections, rings, collars, tabs, or the like, configured to separate the first or second outer sleeve 622, 640 from the first or second inner housing 628, 646. The spacers 636, 654 may extend about a perimeter of the first or second inner housing 628, 646 along an outer surface 658, 660, and along the first or second outer sleeve 622, 640 along an inner surface 662, 664. In at least one embodiment, one or more fluid ports may extend through a spacer 636, 654 to provide a fluid pathway into the first and second cooling chambers 638, 656 from an environment outside of the cross-flame duct 600 or the first or second outer sleeves 622, 640.

In at least one embodiment, the spacers 636, 654 may be formed from annular rings extending circumferentially between outer surfaces 658, 660 of the first and second inner housings 628, 646 and the inner surfaces 662, 664 of the first and second outer sleeve 622, 640. The first duct 602 may include a standoff 634 including a fixed spacer 636 extending between and in contact with the first outer sleeve 622 and the first inner housing 628. The spacer 636 may be an annular ring extending between the outer surface 658 of the first inner housing 628 and the outer surface 660 of the first outer sleeve 622. In one configuration, the spacer 636 may be attached to the first outer sleeve 622 and the first inner housing 628 via a weld. The second duct 606 may include a standoff 652 including a fixed spacer 654 extending between and in contact the second outer sleeve 640 and the second inner housing 646. The second outer sleeve 640 and the second inner housing 646 may also be attached to the spacer 654 via a weld.

As shown in FIGS. 26A and 26B, the second outer sleeve 640 may include a first portion 640b and a second portion 640a that may be attached to the spacer 654 via a weld, such as a plugweld about a surface of the spacer 654. The spacer 654 may also subdivide the second cooling chamber 656 into a first cooling subchamber 656a and a second cooling subchamber 656b. The first and second cooling subchambers 656a, 656b may be fluidically coupled, e.g., via fluid ports 657 in the spacer 654 or between multiple spacers 654. In the illustrated embodiment, however, the spacer 654 does not include fluid ports and the first and second cooling subchambers 656a, 656b are not fluidically coupled through such fluid ports.

In at least one embodiment, as shown in FIGS. 26A and 26B, the second end 644 of the second outer sleeve 640 may extend beyond the second end 650 of the second inner housing 646 and may include a female portion configured to receive the male portion of the first duct 602. The second end 644 of the second outer sleeve 640 may be configured to slidably receive the second end 632 of the first inner housing 628 to form the slip joint to allow relative movement between the first duct 602 and the second duct 606. When the second end 632 of the first inner housing 628 is received by the second end 644 of the second outer sleeve 640, a third cooling chamber 674 is formed between the outer surface 660 of the second end 632 of the first inner housing 628 and the inner surface 664 of the second end 644 of the second outer sleeve 640. One or more standoffs 670 may be positioned along the outer perimeter of the first inner housing 628 and the inner perimeter of the second outer sleeve 640. The standoff 670 may be provided to radially offset the second end 644 of the second outer sleeve 640 from the second end 632 of the first inner housing 628. The standoff 670 may be formed from one or more spacers 672 configured to maintain a third cooling chamber 674. In at least one embodiment, the third cooling chamber may have a consistent width. The spacers 672 may be formed on the first inner housing 622 or the second outer sleeve 640 and may include rings, collars, radial projections, or the like.

As shown in FIGS. 26A and 26B, a plurality of spacers 672 including dimples may be formed on the second duct 606 about its perimeter. While the one or more spacers 672 may be positioned on either or both of the first inner housing 628 or second outer sleeve 640, a plurality of spacers 672 may be positioned on an inner surface 664 of the second outer sleeve 640 and may be configured to slidably contact the adjacent outer surface 658 of the first inner housing 628. As such, the standoff 670 may be a dynamic standoff 670 formed from one or more dynamic spacers 672 configured to maintain a third cooling chamber 674 with a consistent width that may enable generally longitudinal movement between the first duct 602 and second duct 606 and a corresponding change in a longitudinal length of the third cooling chamber 674.

When multiple spacers 672 are provided, the spacers 672 may be positioned at intervals or as otherwise needed. The spacers 672 may be arranged such that fluid ports 676 or fluid paths are defined therebetween to allow fluid to flow from the exterior environment into the third cooling chamber 674. In at least one embodiment, one or more spacers 672 may include an annular ring or collar. The annular ring or collar may provide a full or partial seal between the first and second ducts 602, 606. In some such embodiments, one or more fluid ports 676 may be defined in the second outer sleeve 640 adjacent the spacer 672. In one embodiment, various fluid ports 676 are defined between spacers 672 to provide an inlet fluid path between an exterior environment and the third cooling chamber 674. As shown in FIGS. 26A and 26B, the spacers 672 may include one or more dimples formed in the second outer sleeve 640. The spacers 672 may have any appropriate shape, such as, but not limited to, any geometric, non-geometric, regular, or irregular shape.

As shown in FIGS. 26A and 26B, the second end of the second outer sleeve 640 may be a flared lip 680, which may further increase cooling or fluid flow. In one embodiment, the second end 644 of the second outer sleeve 640 may extend to or be slidably extendable to the second end 626 of the first outer sleeve 622 along the outer surface 658 of the first inner housing 628. In another configuration, the second outer sleeve 640 may slidably receive the second end 626 of the first outer sleeve 622 to form a triple wall configuration along a portion of the cross-flame duct 600. The spacers 672 may be positioned such that the third cooling chamber 674 is divided into two fluidically coupled third cooling subchambers 674a, 674b. The second cooling subchamber 674b may include an inlet 682, forming a fluid port 676, from the exterior environment to the second cooling chamber 674b. The first subchamber 674a may include an outlet 684 to the inner aspects of the cross-flame duct 600. In at least one embodiment, however, the spacers 672 may be provided such that only a third cooling chamber 674 is provided along the interface of the first and second ducts 602, 606.

One or more fluid ports 676 may be positioned in the first or second ducts 602, 606 to provide fluid pathways between the exterior environment of the first or second outer sleeve 622, 640 and the first, second and third cooling chambers 638, 656, 674 defined between the inner housing 628, 646 and the outer sleeve 622, 640. For example, differential pressure may drive gas flow from an exterior environment into the first, second and third cooling chambers 638, 656, 674, e.g., drive flow of cooler shell air into the duct. The cooling fluid may be exhausted from the first, second and third cooling chambers 638, 656, 674 into the inner chambers within the inner housings 628, 646 and into the combustors 501, 502. First and second outer sleeves 622, 640 may include one or more fluid ports 676. Such fluid ports 676 may be radially oriented with respect to the cross-flame duct 600.

In at least one embodiment, each first, second and third cooling chamber 638, 656, 674 may each include at least one fluid port 676 or fluid path to couple the first, second and third cooling chambers 638, 656, 674 with the exterior environment, e.g., cooling air flow. In various embodiments, the first and second cooling chambers 638, 656 adjacent to a flange 614, 620 or combustor 501, 502 may include outlets 677 to the combustor 501, 502, combustor flange 503, 504, or associated combustion path to reduce overheating of the respective flanges 614, 620 and ducts 602, 606 in the flange area.

Figure 27A:
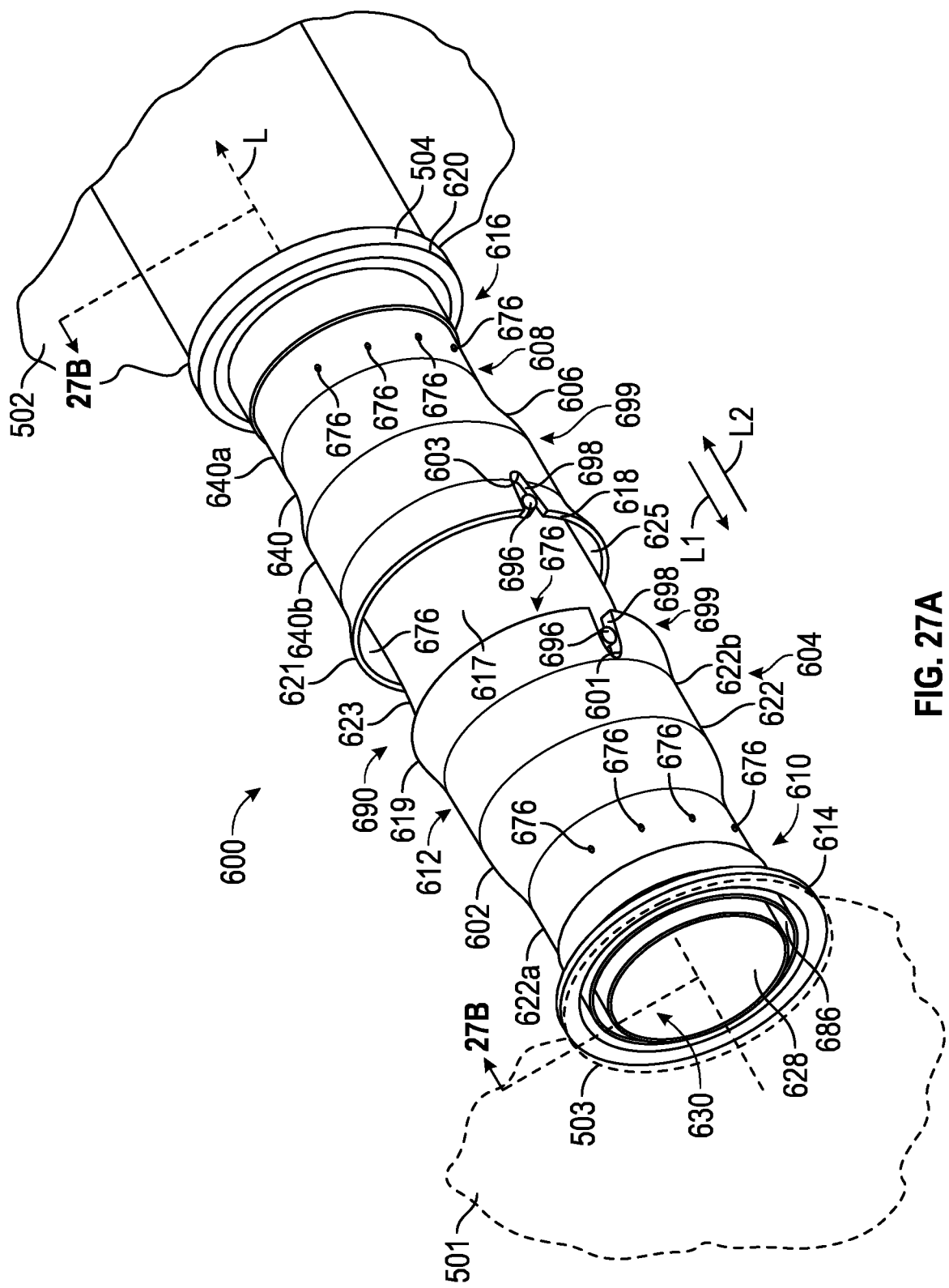
FIG. 27A is a perspective view of another embodiment of a cross-flame duct according to various embodiments described herein.
Figure 27B:
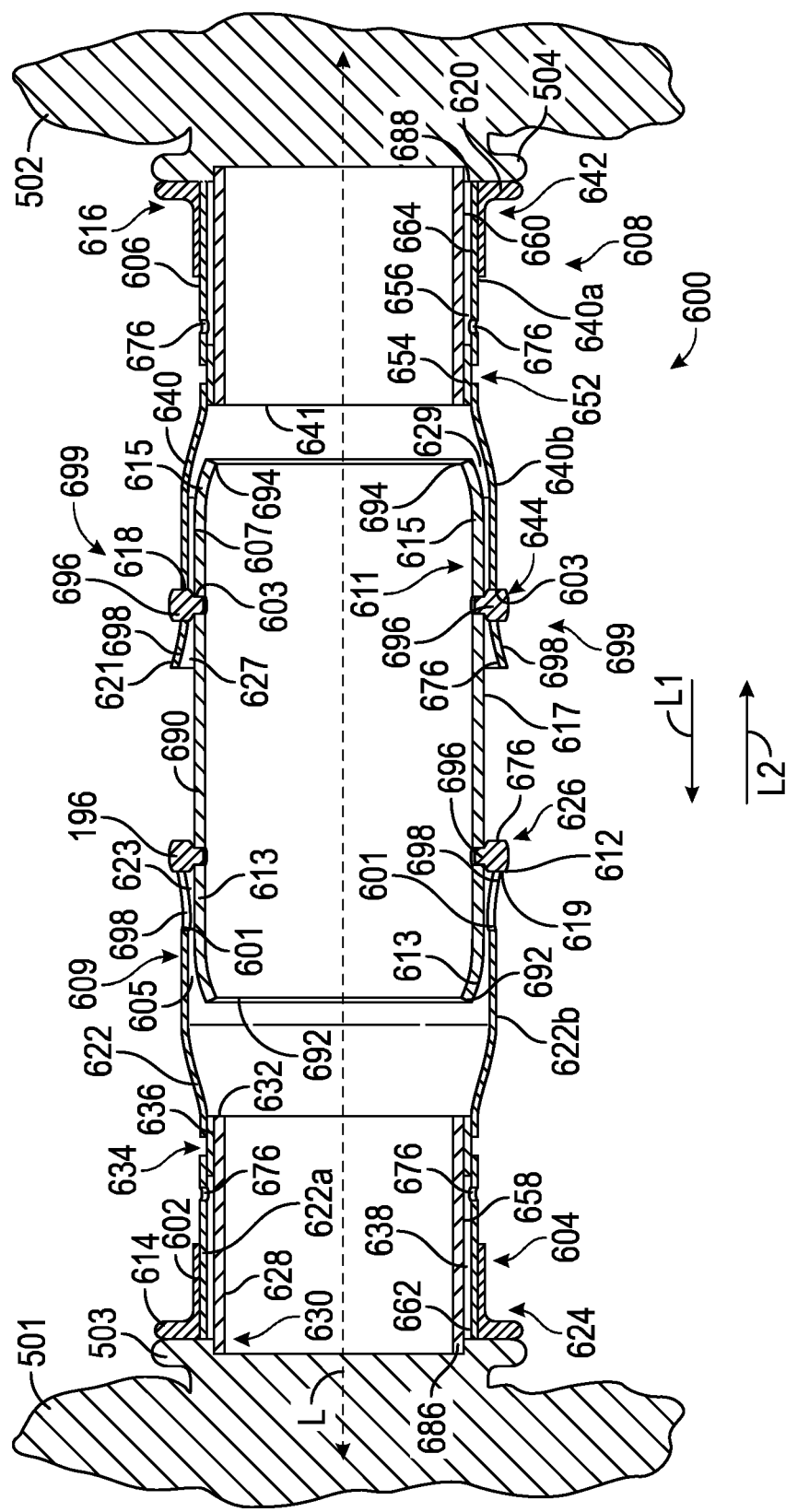
FIG. 27B is a longitudinal cross-section view of the cross-flame duct of FIG. 27A taken along section line 27B-27B of FIG. 27A.
Figure 28:
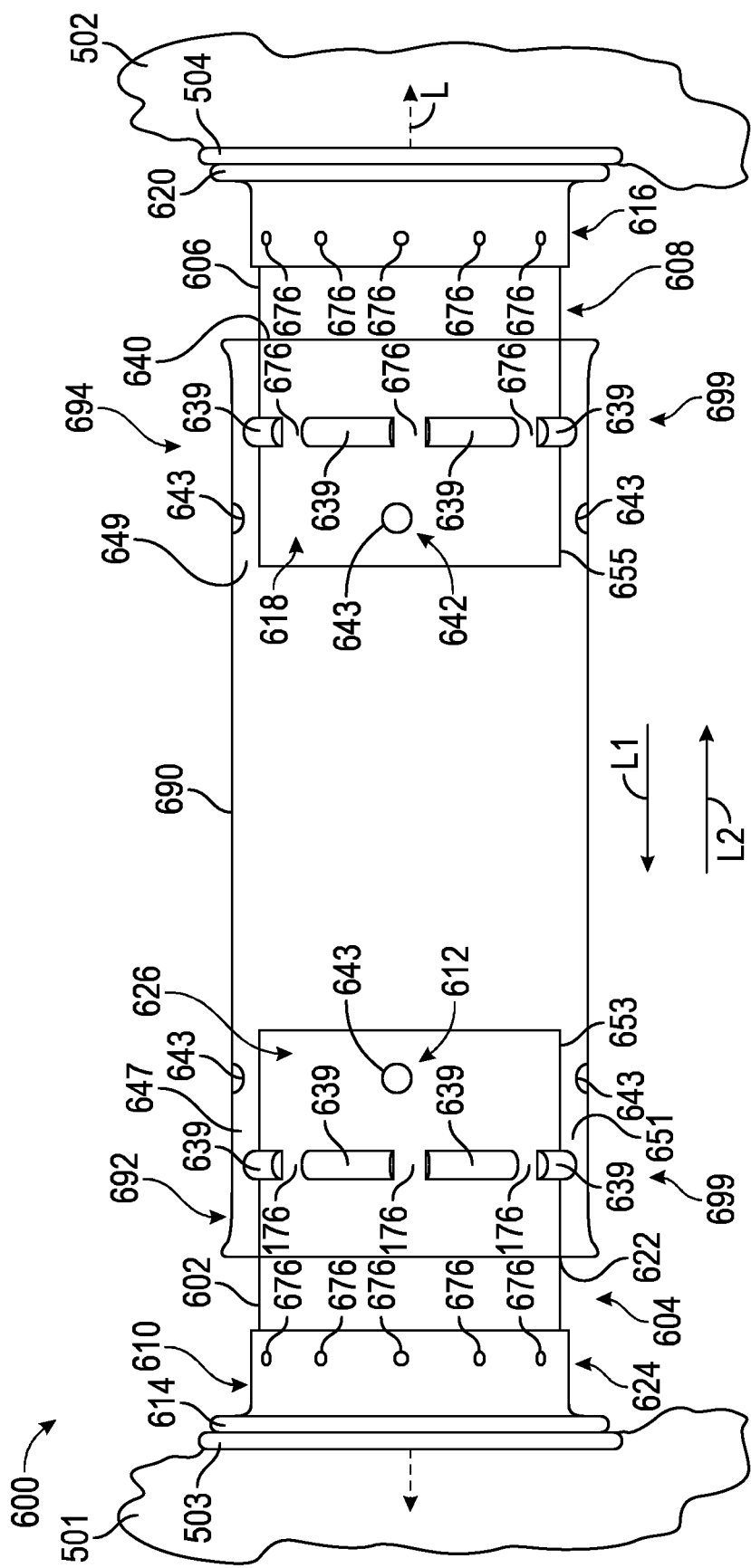
FIG. 28 is a perspective view of yet another embodiment of a cross-flame duct in which the third duct is shown partially transparent according to various embodiments described herein.

As shown in FIGS. 27A-28, the cross-flame 600 duct may include a third duct 690. The third duct 690 may be configured to be movably associated with respect to the first duct 602 or the second duct 606, or both. The third duct 690 may couple the first and second ducts 602, 606 together. For example, the third duct 690 may include a first end 692 configured to receive or be received by the first duct 602 and a second end 694 configured to receive or be received by the second duct 606. In one embodiment, as shown in FIGS. 27A and 27B, the third duct 690 may include two male ends configured to be received by female ends of each of the first and second ducts 602, 606. In another embodiment, as shown in FIG. 28, the third duct 690 may include two female ends configured to receive a male end of each of the first and second ducts 602, 606. In other embodiments, the third duct 690 may include a male end configured to be received by a female end of the first duct 602 and a female end configured to receive a male end of the second duct 606, or vice versa. In at least one embodiment, the first duct 602, the second duct 606, and third duct 690 may be configured for relative movement such that the first component 602 may move relative to the second duct 606 or the third component 690, or both, and the second duct 606 and the third component 690 may move relative to each other.

As shown in FIGS. 27A and 27B, the cross-flame duct 600 may include a third duct 690 having a first end 692 and a second end 694. The third duct 690 may be a free floating middle duct that provides additional flexibility. The position of the third duct 690 may be controlled with one or more pins 696 positioned within slots 698 that limit rotation of the third duct 690 and limit floatable movement along the longitudinal axis L. A hard-face coating and TBC, for example, may be used similar to the embodiment described above with respect to FIGS. 26A & 26B. A double wall configuration for cooling and dimples may similarly be employed.

The cross-flame duct 600 may include a first duct 610 positioned at a first end 604 of the cross-flame duct 600 and a second duct 606 positioned at a second end 608 of the cross-flame duct 600. The first duct 610 may extend from a first end 610 to a second end 612. The first end 610 may be configured to include a flange 614 for coupling the first end 604 of the cross-flame duct 600 to the first combustor 501. The second duct 606 may extend from a first end 616 to a second end 618. The first end 616 may be configured to include a flange 620 for coupling the second end 608 of the cross-flame duct 600 to the second combustor 502.

The cross-flame duct 600 may further include the third duct 690. The third duct 690 may be configured to mate with the first duct 610 and the second duct 606 to form a slip joint therebetween. When mated to the first and second ducts 610, 606, the third duct 690 may be configured for generally longitudinal movement relative to one or both of the first and second ducts 610, 606. The third duct 690 may be coupled to the first duct 610 and the second duct 606 such that the third duct 690 may float between the two from a first longitudinal position, in direction of L1, to a second longitudinal position, in direction of L2. For example, the second end 612 of the first duct 610 may be configured to mate with a first end 692 of the third duct 690 and the second end 618 of the second duct 606 may be configured to mate with a second end 618 of the third duct 690.

A shown in FIGS. 27A & 27B, the second end 612 of the first duct 610 may include a female coupling configured to receive the first end 692 of the third duct 690, which may include a male coupling. The second end 618 of the second duct 606 may also include a female coupling and be configured to receive the second end 694 of the third duct 690, which may include a male coupling. The second ends 612, 618 of the first and second ducts 610, 606 may include inner diameters greater than an outer diameter of the first end 692 and the second end 694 of the third duct 690. To form the slip joint, the second end 612 of the first duct 610 may receive the first end 692 of the third duct 690 within its inner diameter, and the second end 618 of the second duct 606 may receive the second end 694 of the third duct 690 within its inner diameter. When mated, the first duct 610 and the second duct 606 may slide longitudinal, and the third duct 690 may float therebetween. The longitudinal sliding or floating may allow the cross-flame duct 600 to compensate for thermal expansion during operation of the gas turbine.

As introduced above, the third duct 690 is configured to float between the first and second ducts 610, 606 between a first longitudinal position, in direction of L1, and a second longitudinal position, in direction of L2. The distance along which the third duct 690 may longitudinally float may be defined between a first stop 601 and a second stop 603. While any manner of defining the longitudinal distance or range that the third duct 690 may float may be used, in the illustrated embodiment, a position control system 699 may be used to limit movement. In at least one embodiment, the position control system 699 may be formed from one or more pins 696 positioned within one or more slots 698. In particular, the first end 692 and second end 694 of the third duct 690 may each include at least one pin 696, and the second ends 612, 618 of the of the first and second ducts 610, 606 each may include at least one slot 698 configured to receive a pin 696. The distance or range the third duct 690 may float toward the first position in direction L1 is limited by the first stop 601 and the distance the third duct 690 may float toward the second position in direction L2 is limited by the second stop 603. Each slot 698 may include a stop 601, 603 to limit translation of the pin 696 and hence the longitudinal distance in which the third duct 690 may float in directions L1 and L2. Each slot 698 may include one or more stops 601, 603 or stops 601, 603 may be provided in less than all the slots 698. As shown in FIGS. 27A and 27B, the third duct 690 is in the second position, in direction of L2, as the pins 696 have reached the second stop 603 positioned at the end of the at least one slot 698 of the second duct 606.

The cross-flame duct 600 may be configured such that one or both of the first ends 610, 616 of the first and second ducts 610, 606 may be shifted up or down with respect to a respective combustor 501, 502 to enable the cross-flame duct 600 to line up with the combustors 501, 502, for example, when the combustors 501, 502 or associated fittings are axially misaligned. As explained above, for example, the cross-flame duct 600 may include flanges 614, 620 that are undersized to compensate for assembly tolerances.

As shown in FIGS. 27A and 27B, when the second end 626 of the first outer sleeve 622 may receive the first end 692 of the third duct 690, a third cooling chamber 605 may be positioned between the outer perimeter of the second end 632 of the first inner housing 628 and the first end 692 of the third duct 690. When the second end 644 of the second outer sleeve 640 receives the second end 694 of the third duct 690, a fourth cooling chamber 607 may be positioned between the outer perimeter of the second end 650 of the second inner housing 646 and the second end 694 of the third duct 690. The first end 630 of the first inner housing 628 and the first end 650 of the second inner housing 646 may extend along the longitudinal axis to a position beyond the first ends 624, 644 of the first and second outer sleeves 622, 640 and the flanges 614, 620. In various embodiments, the first and second cooling chambers 638, 656 may be positioned between the inner housings 628, 646 and the outer sleeves 622, 640 may open into the combustor 501, 502 or associated fitting at one first end and extend to the spacer 636, 654 at a second end.

The second ends 626, 644 of the first and second outer sleeves 622, 640 may extend beyond the second end 632, 641 of the first and second inner housings 628, 646 and may include female portions configured to slidably receive the male portions positioned at the first and second ends 692, 694 of the third duct 690 such that the third duct 690 may longitudinally float therebetween as defined by the limiters. Standoffs 609, 611 may be positioned along the outer perimeters of the first and second ends 692, 694 of the third duct 690 and the inner perimeters of the second ends 626, 644 of the first and second outer sleeves 622, 640. The standoffs 609, 611 may be formed from one or more spacers 613, 615 configured to maintain the third and fourth cooling chambers 605, 607. While the one or more spacers 613, 615 may be positioned on either or both of the third duct 690 and the first and second outer sleeves 622, 640, in FIGS. 27A and 27B, the spacers 613, 615 may be positioned on outer surface 617 of the third duct 690 along the first and second ends 692, 694 and may be configured to slidably contact the adjacent inner surfaces 662, 664 of the first and second outer sleeves 622, 640. As such, the standoffs 609, 611 may be formed from dynamic standoffs 609, 611 that include one or more dynamic spacers 613, 615 configured to maintain a third and fourth cooling chambers 605, 607 while also permitting floatable longitudinal movement of the third duct 690 between a first position, in direction of L1, and a second position, in direction of L2, expansion of the first and second ducts 610, 606, and corresponding changes in a longitudinal length of the annulus spaces 605, 607 maintained by the spacers 613, 615. When multiple spacers 613, 615 are provided, the spacers 613, 615 may be positioned at intervals or as otherwise needed. In at least one embodiment, the one or more spacers 613, 615 may be formed from an annular ring or collar. The annular ring or collar may provide a full or partial seal between the first and second ducts 610, 606. In some such embodiments, one or more fluid ports may be defined in the outer sleeve 622, 640, e.g., adjacent to a spacer 613, 615. As shown in FIGS. 27A and 27B, the spacers 609, 611 may include one or more conical or arcuate dimples formed on the first and second ends 692, 694 of the third duct 690. The dimples may include engagement surfaces configured for limited surface area contact with adjacent surfaces. In various embodiments, the spacers 609, 611, e.g., dimples, may have any geometric, non-geometric, regular, or irregular shape. The spacers may be positioned at intervals to enable fluid ports to be positioned therebetween.

The second ends 626, 644 of the first and second outer sleeves 622, 640 may include flared lips 619, 621, which may further increase cooling or fluid flow available to the first and second portions. Similar to the embodiment described above with respect to FIGS. 26A & 26B, when the third duct 690 is received by the second ends 626, 644 of the first and second outer sleeves 622, 640, third and fourth cooling chambers 605, 607 may be defined between the outer surface 617 of the third duct 690 and the inner surfaces 662, 664 of the second ends 626, 644 of the first and second outer sleeves 622, 640. Standoffs 609, 611 including spacers 613, 615, as described above, may be provided to standoff the second ends 626, 644 from the third duct 690. Each of the third and fourth cooling chambers 605, 607 may include an inlet 623, 625 that is open to the exterior environment and an outlet 627, 629 that is open to the inner aspects of the cross-flame 600. In at least one embodiment, however, the spacers 613, 615 may be provided such that only a single third or fourth cooling chamber 605, 607 is provided along the interface of the first and second ducts 610, 606 and the third duct 690.

The second ends 626, 644 of the first and second outer sleeves 622, 644 may extend beyond the second ends 632, 650 of the first and second inner housings 628, 646. Along this portion, the outer sleeves 622, 640 may flare outwardly to increase and increase in volume to accommodate the third duct 690. For example, as shown in FIGS. 27A and 27B, the second outer sleeve 640 may include a first portion 640a and a second portion 640b that may be attached to the spacer 654, e.g., via a weld. In one embodiment, the first or second outer sleeve 622, 640 may include fewer or more portions and is not limited in this respect. The first outer sleeve 622 may also include a first portion 622a and a second portion 622b that may be attached to the spacer 636, e.g., via a weld. In at least one embodiment, the section portion 622b may have a larger inner diameter than an inner diameter of first portion 622a. In other embodiments, the outer sleeves 622, 640 may not be flared. The first and second ends 692, 694 of the third duct 690 are also depicted to decrease in diameter, however, in at least one embodiment, the first and second ends 692, 694 may maintain a consistent diameter.

Similar to the cross-flame duct 600 of FIGS. 27A & 27B, the cross-flame duct 600 shown in FIG. 28 also includes a third duct 690. The third duct 690 may be configured to float between a first longitudinal position, in direction of L1, and a second longitudinal position, in direction of L2. The extent the third duct 690 may float may be defined by a limiter configuration similar to the embodiments described above with respect to FIGS. 27A & 27B. For example, one or more pins 696 and slots 698 may be used to prevent or define rotation of the third duct 690 and limit or define its movement along the longitudinal axis L. As shown in FIG. 28, standoffs 631, 633 each include one or more spacers 639 to form third and fourth cooling chambers 647, 649. The third and fourth cooling chambers 647, 649 may have any appropriate configuration. In at least one embodiment, the third and fourth cooling chambers 647, 649 may be concentric with the third duct 690. The spacers 639 may limit the longitudinal distance the third duct 690 may float. The third duct 690 may also be configured for floatable rotation. Hard-face coating and TBC, for example, may be used similar to the embodiments described above with respect to FIGS. 26A-27B.

The first and second ducts 602, 606 of the cross-flame duct 600 may be similar to the first and second ducts 602, 606 of the embodiments described above with respect to FIGS. 26A-27B in that the first and second ducts 602, 606 of FIG. 28 may also include the double wall configuration. Thus, each of the first and second ducts 602, 606 may each include an outer sleeve 622, 640 and an inner housing 628, 646 (not visible) that define at least one first and second cooling chamber 638, 656 (not visible). Similar to FIGS. 26A-27B, one or both of the first and second flanges 614, 620 may be undersized with respect to the combustor flange 503, 504 to which it is to connect to allow for compensation for assembly tolerances.

The third duct 690 may form a double wall configuration for additional cooling with standoffs 631, 633 formed from spacers 639, 643 positioned between the inner surface 651 of the third duct 690 and outer surfaces 653, 655 of the first and second ducts 602, 606. The spacers 639, 643 may be configured to move relative to an adjacent surface to maintain an annulus space 647, 649 between the inner surface 651 of the third duct 690 and both the outer surfaces 653, 655 of the first and second outer sleeves 622, 640. The second ends 626, 644 of the first and second outer sleeves 622, 640 may include male portions configured to slidably receive female portions positioned of the third duct 690 positioned at its first and second ends 692, 694 such that the third duct 690 may longitudinally float therebetween with respect to the longitudinal axis L. The third duct 690 may also be rotatable about the outer perimeters of the first and second outer sleeves 622, 640. In other embodiments, however, rotation may be limited, e.g., by a pin and slot configuration as described above, or by guidable floating of the spacers 639, 643 through grooves defined in a surface of the ducts 602, 606, 690, which may include grooves defined by or between spacers 639, 643.

The spacers 639, 643 may be positioned at intervals or as otherwise needed. In at least one embodiment, the spacers 639, 643 may include an annular ring or collar. In at least one embodiment, one or more fluid ports 676 may be defined between adjacent spacers 639, 643 or grooves formed at the outer surface 617 of the third duct 690 or inner surface 662, 664 of the first or second outer sleeve 622, 640. As shown in FIG. 28, the first and second outer sleeves 622, 640 may include spacers 639 formed from radially extending ridges positioned at intervals along the outer perimeter of the first and second outer sleeves 622, 640. However, in various embodiments, the spacers 639 may have any geometric, non-geometric, regular, or irregular shape.

When the third duct 690 receives the first and second outer sleeves 622, 640, fluid ports 676 may be defined between the spacers 639. The fluid ports 676 may be longitudinally oriented, as shown in FIG. 28, to provide general longitudinal fluid flowpaths for passage of cooling fluid. In at least one embodiment, the spacers 639 may be positioned in multiple rows or columns to define third and fourth cooling chambers 647, 649 and fluid ports 676. In at least one embodiment, a fluid port 676 may be defined through the third duct 690. The third and fourth cooling chambers 647, 649 may be include at least one inlet to receive a cooling fluid, such as, but not limited to air, from the exterior environment, e.g., the third and fourth cooling chambers 647, 649 may be in fluid communication with the exterior environment to cooling air flow through a fluid port 676. The first and second ends 692, 694 of the third duct 690 may also be flared for increased fluid availability. In at least one embodiment, differential pressure may drive gas flow from an exterior environment into the third and fourth cooling chambers 647, 649, e.g., drive flow of cooler shell or casing air into the cross-flame duct 600. The cooling air may pass through the third and fourth cooling chambers 647, 649 and into the combustors 501, 502.

As shown in FIG. 28, the cross-flame duct 600 may include a position control system 699 for limiting movement of the third duct 690 relative to the first and second ducts 602, 606. In at least one embodiment, the third duct 690 may include radially extending spacers 643 having a dimple form. However, in various embodiments, the spacers 643 may have any geometric, non-geometric, regular, or irregular shape. Fewer or additional spacers 643 may also be provided. Whereas the cross-flame duct 600 of FIGS. 27A & 27B includes a pin and slot arrangement to limit the longitudinal distance the third duct 690 may float, the cross-flame duct 600 shown in FIG. 28 may limit longitudinal floatation of the third duct 690 using the spacers 639, 643. For example, the third duct 690 in FIG. 28 is illustrated in a mid-position between a first position, in direction of L1, toward the first end of the first duct 602 and a second position, in direction of L2, toward the first end of the second duct 606. The fluid ports 676 defined between the ridge shaped spacers 639 are dimensioned to prevent passage of the dimple shaped spacers 643. Thus, when the third duct 690 floats toward the first position, in direction L1, the dimple shaped spacers 643 formed on the first end 692 of the third duct 690 engage the ridge shaped spacers 639 defined on the first duct 602 to prevent further longitudinal floatation of the third duct 690 toward the first end 610 of the first duct 602. Similarly, when the third duct 690 floats toward the second position, in direction of L2, the dimple shaped spacers 643 formed on the second end 694 of the third duct 690 are configured to engage the ridge shaped spacers 639 defined on the second duct 606 to prevent further longitudinal floatation of the third duct 690 toward the first end 616 of the second duct 606.

The spacers 639, 643 may be positioned on either or both of the third duct 690 or the first and second outer sleeves 622, 640. As shown in FIG. 28, the spacers 639, 643 may be positioned on the inner surface 651 of the third duct 690, along the first and second ends 692, 694, and the outer surface 653, 655 of each of the first and second outer sleeves 622, 640. The spacers 639, 643 may be configured to slidably contact the adjacent inner or outer surfaces 651, 653, 655. As such, the standoffs 631, 633 and associated spacers 639, 643 may be dynamically configured to maintain third and fourth cooling chambers 647, 649. In at least one embodiment, the spacers 639, 643 may maintain consistent width third and fourth cooling chambers 647, 649 in a dynamic environment that includes floatable longitudinal movement of the third duct 690 between a first position, in direction of L1, and a second position, in direction of L2, expansion of the first and second ducts 602, 606, and corresponding changes in a longitudinal length of the third and fourth cooling chambers 647, 649.

The outer and inner diameters of the interfacing portions of the first, second, and third ducts 602, 606, 690 or the standoffs 631, 633 may be dimensioned to provide various sized annulus spaces 647, 649 and to control fitment. For example, the cross-flame duct 600 shown in FIG. 28 may include dimple shaped spacers 643 and ridge shaped spacers 639 having arcuate dimensions for engagement with adjacent surfaces of the second ends 626, 644 of the first and second outer sleeves 622, 640 and the first and second ends 692, 694 of the third duct 690. The dimple shaped spacers 643 may extend a radial distance into the third and fourth cooling chambers 647, 649 that is less than the radial distance that the ridge shaped spacers 639 extend into the third and fourth cooling chambers 647, 649. Thus continuous engagement between the dimple shaped spacers 643 and the adjacent outer surfaces 653, 655 of the second ends 626, 644 of the first and second outer sleeves 622, 640 may not be required. As shown in FIG. 28, the fitment of the third duct 690 with the first and second outer sleeves 622, 640 may allow the third duct 690 to be offset to provide mechanical play with respect to the alignment of the first duct 602 and the second duct 606. For example, radial misalignment between the first duct 602 and the second duct 606 may cause the inner surface 651 of the third duct 690 to roll along the arcuate engagement surfaces of the ridge shaped spacers 639 until the clearance between one or more dimple shaped spacers 643 and the adjacent outer surface 653, 655 of the first or second outer sleeve 622, 640 is reduced such that one or more dimple shaped spacers 643 engage the outer surface 653, 655. Even when the third duct 690 is offset such that one or more dimple shaped spacers 643 are engaged with the adjacent surface 653, 655 of the outer sleeve 622, 644, a consistent minimum radial distance and volume of the annulus space 647, 649 is maintained. The outer diameters of the first and second outer sleeves 622, 640 or the inner diameters of the first and second ends 692, 694 of the third duct 690 may also be modified to increase or decrease the tightness of the fit along the slip joint to control the floatability of the third duct 690 or available mechanical play with respect to the alignment of the first and second ducts 602, 606.

Transition Component

As described previously relative to FIGS. 1 and 2, the transition component 28 delivers hot combustion gases from the combustor 14 to the turbine section 16. Efficient flow through, and effective cooling of, the transition component 28 are therefore also very important. One design for improved transition component cooling is described in U.S. patent application Ser. No. 14/058,705, titled "REVERSE BULK FLOW EFFUSION COOLING", filed Oct. 21, 2013, assigned to the assignee of the present application.

Described below is a design where effusion cooling holes are formed through a transition component provided in a combustion section of a gas turbine engine. The effusion cooling holes are formed through an outer wall of the transition component in a direction so that the flow of air through the effusion holes is in a direction substantially opposite to the bulk flow direction of the working gas through the transition component. Item reference numbers in FIGS. 29-30 are consistent with, and may make reference to, FIGS. 1 & 2.

Figure 29:
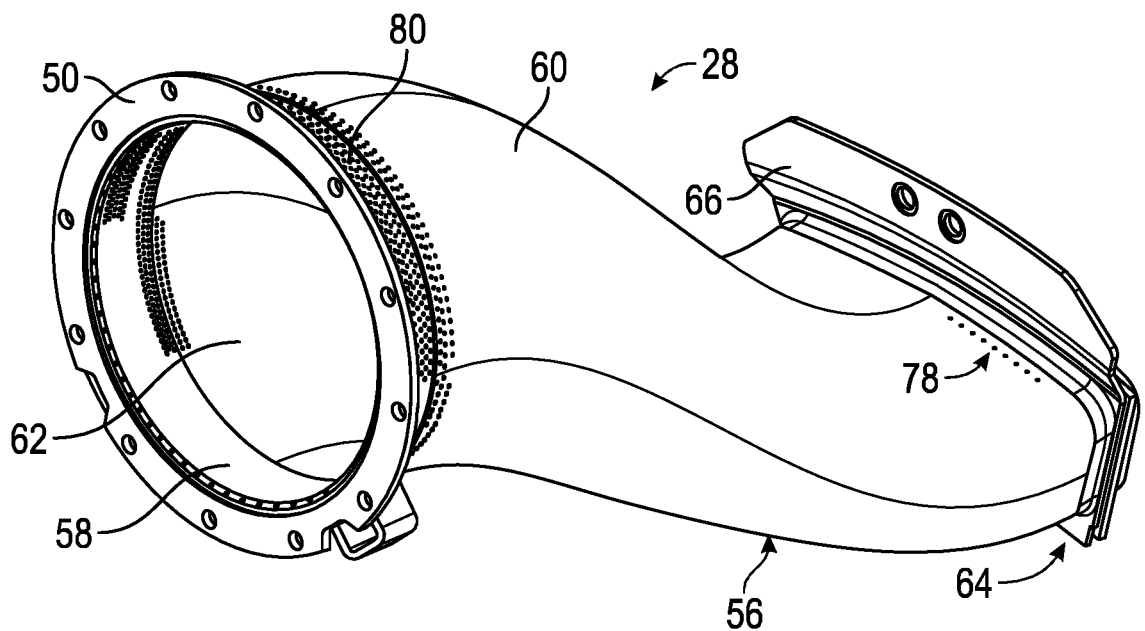
FIG. 29 is an isometric view of a transition component separated from the combustion section shown in FIG. 2.
Figure 30:
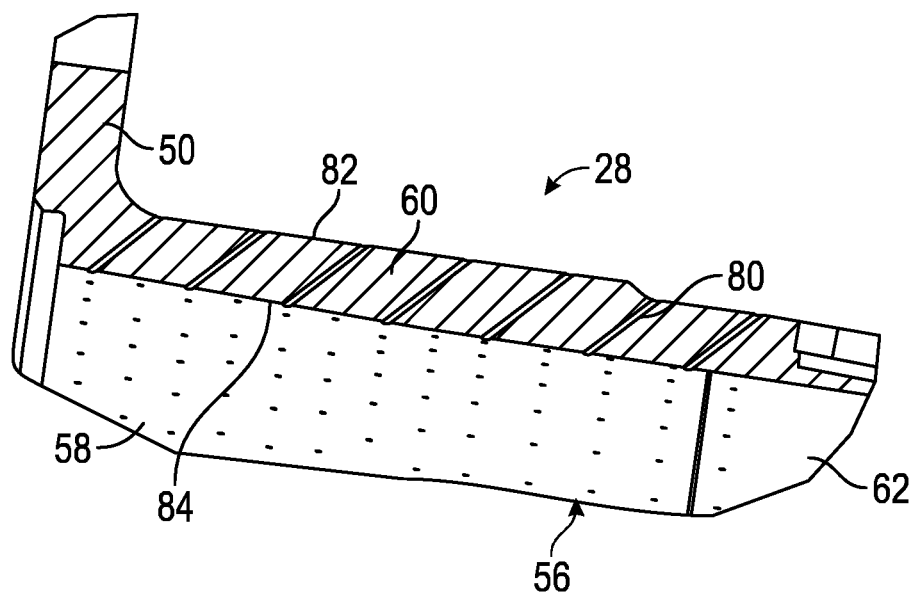
FIG. 30 is a cutaway, cross-sectional view of a portion of the transition component shown in FIG. 29.

FIG. 29 is an isometric view of the transition component 28 separated from the combustion section 14. The combustor 26 includes a nozzle section 40 through which the fuel is injected into a cylindrical combustor basket 42 in a manner well understood by those skilled in the art. Air from the compressor section 12 enters the combustor basket 42 through circumferentially disposed openings 44, where the air/fuel mixture is ignited by the igniters 24 to generate the hot working gas that flows towards an output end 46 of the basket 42 opposite to the nozzle 40. The transition component 28 includes an annular flange 50 at an input end that is mounted to an annular flange 48 at the output end 46 of the basket 42. The transition component 28 also includes a curved transition section 56 extending from the flange 50 that includes an inlet ring portion 58 and an outer wall 60 defining an internal chamber 62, where the transition section 56 includes an upper panel and a lower panel. An end of the transition section 56 opposite to the flange 50 includes an output structure 64 having a mounting flange 66 through which the working gas is output to the turbine section 16. The transition section 56 transitions from a circular opening at the input end of the component 28 to a rectangular opening at the output end of the component 28. The mounting flange 66 is mounted to a ring bracket 68 that is secured to a blade ring 70, all well known to those skilled in the art. The output structure 64 of the transition section 56 is positioned adjacent to row 1 vanes 72 that receive and direct the hot gas to the row 1 blades. A mounting bracket 74 is mounted to the outer wall 60, as shown, and to a compressor exit diffuser 76.

As discussed above, it is necessary to provide cooling air to many of the components in the combustor section 14 and the turbine section 16 of the gas turbine engine 10. One of those components that require cooling is the transition component 28 as it receives the hottest temperature of the working gas right after combustion. It is known to provide a configuration of spaced apart effusion cooling holes through the transition component 28 that allow pressurized air from the compressor section 12 provided within the casing 30 to flow therethrough and into the chamber 62 to ultimately be mixed with the working gas, but providing the necessary cooling to the wall 60 of the transition component 28. In one known gas turbine engine design, the effusion cooling holes extend through the wall 60 of the transition section 56 at an angle so that the cooling air enters the chamber 62 and flows in a direction that is with the bulk flow of the working gas flowing through the chamber 62 from the combustor basket 42 to the first row of the vanes 72. By providing the holes on an angle, the holes are longer and thus provide greater wall cooling. It was believed that this angle of the effusion cooling holes also prevents the hot working gas from flowing through the holes and into the casing 30.

It has been discovered that there is a localized recirculation flow of the hot working gas at some locations along the inside surface of the wall 60 that is caused by the exit cone at the end 46 of the basket 42, where the recirculation flow is opposite to the bulk flow. This localized recirculation flow is also in a direction substantially opposite to the flow of the cooling air entering the chamber 62 through the forward angled effusion cooling holes that flows with the bulk flow direction in the known effusion cooling hole design. The flow interaction of the local recirculation flow and the bulk flow causes the cooling air from the effusion holes to change direction, which causes the cooling air to be pulled away from the inside surface of the wall 60. This interaction reduces the cooling effectiveness and raises the transition metal temperature.

The present invention proposes reversing the angle of at least some of the known effusion cooling holes so that the cooling air flows into the chamber 62 in a direction substantially opposite to the bulk flow, but in substantially the same direction as the localized recirculation flow at those locations where the recirculation flow is occurring. In one non-limiting embodiment, the angle of the effusion cooling holes that are configured and angled in an opposite direction to the bulk flow are only provided in and around the inlet ring portion 58 and just downstream therefrom because that is the area where most of the localized recirculation flow occurs as a result of the bulk flow from the basket 42 into the transition component 28. Therefore, although spaced apart effusion cooling holes may be provided at other locations in the transition section 56, most of those effusion cooling holes that are downstream of the inlet ring portion 58, represented generally as effusion cooling holes 78, are angled in the traditional direction where the cooling flow is in a direction with the bulk flow because the recirculation flow in this area is negligible.

FIG. 30 is a cutaway, cross-sectional view of a portion of the transition component 28 including effusion cooling holes 80 angled in this opposite direction and being provided within and around the inlet ring portion 58 as mentioned. Particularly, the wall 60 includes an outside surface 82 and an inside surface 84, where an opening of the effusion cooling holes 80 at the inside surface 84 is farther upstream, i.e., closer to the flange 50, than the opening of the effusion cooling holes 80 at the outside surface 82. Pressurized air in the casing 30 enters the effusion holes 80 and flows into the chamber 62. By providing the cooling airflow into the chamber 62 in substantially the same direction as the recirculation flow, the cooling air mixes with the recirculation flow in a less turbulent manner, which provides a better film of cooling air close to and along the inside surface 84 of the wall 60, which increases the cooling effectiveness. Further, the recirculation flow prevents the hot working gas from flowing into the effusion cooling holes 80 and into the casing 30.

In the non-limiting embodiment shown, the effusion cooling holes 80 are angled at about 45° through the wall 60, where the effusion cooling holes 80 extend through the outer wall 60 in a direction so that an end of the effusion cooling holes at the inside surface 84 is farther upstream relative to the working gas flow than an end of the effusion cooling holes 80 at the outside surface 82. However, although this angle may provide a desired angle for manufacturing purposes, any suitable acute angle can be employed, where longer effusion holes are generally more desirable. It is noted that the diameter of the effusion cooling holes 80, the spacing of the effusion cooling holes 80, the angle of the effusion cooling holes 80 through the wall 60, the number of the effusion cooling holes 80, etc. are all design specific for a particular gas turbine engine to provide the level of desired cooling. The effusion cooling holes 80 are shown as being configured in rows. However, those skilled in the art will recognize that other configurations may be applicable. Different design criteria may be more important in different gas turbine engines, where it may be desirable to provide less of the cooling air to the transition component 28 to provide the same amount of cooling, or it may be desirable to provide better and more efficient cooling to the transition component 28 so as to allow the temperature of the working gas to be increased.

Another design technique can be employed to improve cooling of the transition cylinder, which is the addition of cooling air channels on the exterior of the transition cylinder. During assembly, the combustor basket is inserted fully into the transition cylinder and once installed the transition cylinder is pulled away from the basket to bridge the gap between the basket exit and transition. Due to the fact that the transition cylinder is fully installed on the basket, thermal barrier coating (TBC) is not applied as it would be damaged during the installation process. A change in the cylinder internal profile may be implemented to allow for the application of TBC that would not be damaged during the installation process.

An exit cone is used on the basket to mix the cooling air with the combustion gases and it has been shown through CFD analysis that this exit cone creates a recirculation zone that extends into the transition component. This recirculation zone entrains hot gases which flow along the transition inlet surface towards the basket exit (against the bulk flow direction). This hot gas causes the unprotected transition cylinder to overheat and cracking/greening of the material is common.

Figure 31:
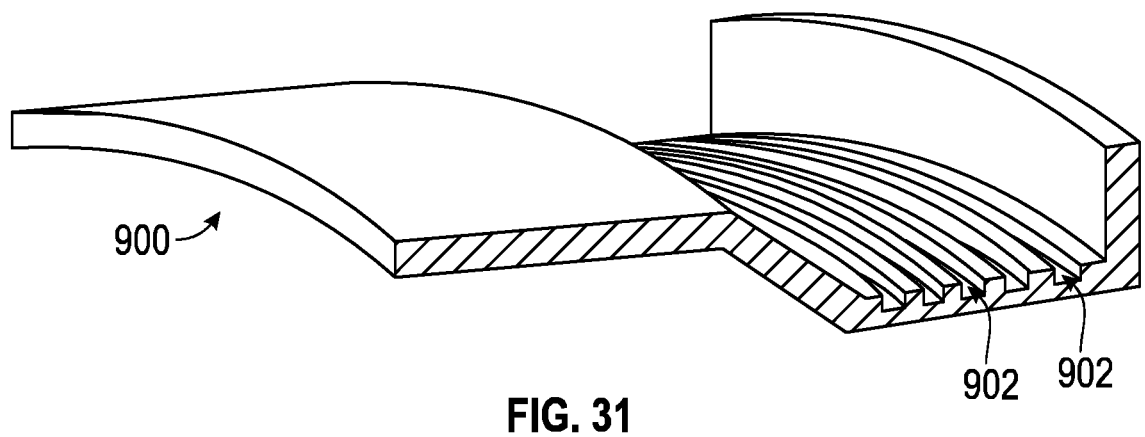
FIG. 31 is an illustration of a transition cylinder which makes up the upstream end of a transition component, including circumferential slots.
Figure 32:
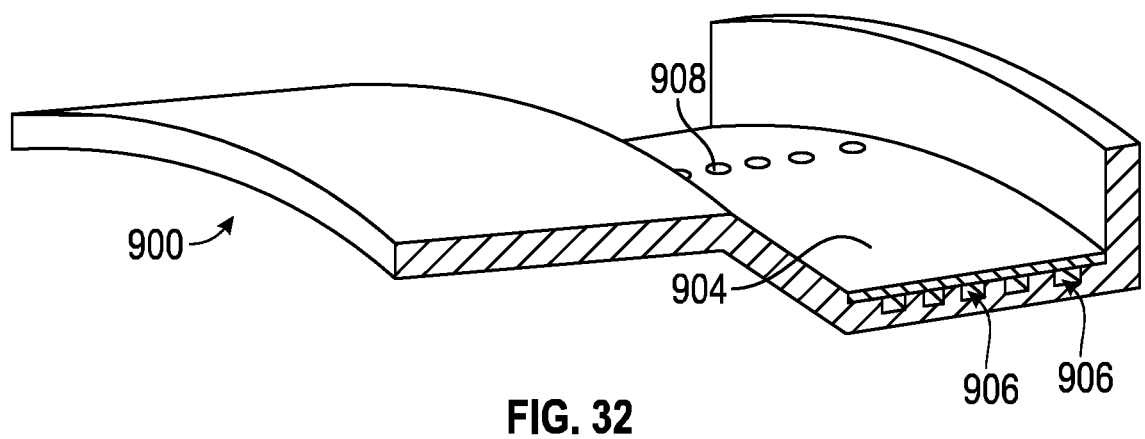
FIG. 32 is an illustration of the transition cylinder of FIG. 31, with a sheet metal section fitted over the slots to form cooling air channels.

FIG. 31 is an illustration of a transition cylinder 900 which adds circumferential channel cooling to its exterior surface in the hot region. The transition cylinder 900 can be forged, cast or machined with circumferential slots 902 machined or cast (depending on fabrication method selected) into the hot region as shown in FIG. 31. These circumferential slots 902 will be used to create cooling channels by using weld build up or any other method to create dams and drilling holes through the valley of the slots to the hot side for cooling air exit. A sheet metal sleeve 904 will be rolled and welded (but not limited to such a fabrication) on top of the slots 902 to complete a series of channels 906 (FIG. 32). Inlet holes 908 will be drilled into the sleeve 904 to introduce cooling air. The configuration of the cooling channels (length, number and circumferential span) can be defined to optimize cooling of the transition cylinder 900 while minimizing incremental cooling air usage.

The benefit of using circumferential channels 906 for this component is that you can maximize the efficiency of the cooling air used (maximum heat extraction) by extending the length of the cooling channels 906 and removing more heat for a given quantity of cooling air. If the cooling channels were aligned axially, the channels would be very short, and an increased number of channels would be required increasing amount of cooling air required.

In addition to the design improvements discussed above, other changes can be made to the transition component 28 to improve performance and durability. For example, a new design of the transition component 28 has been developed using CFD tools to optimize the shape in order to reduce stagnation zones and impingement of the hot combustion gas on transition component walls. This is done by optimizing both cross-sectional shape and side-view profile of the transition component 28, including carefully controlling side-view curvature of the "upper" or outboard wall in the critical elbow area where combustion gas from the combustor 26 is directed. Cooling channel number and placement have also been optimized for transition component temperature and cooling air usage. Exit seal designs have been improved. And transition component material has been upgraded to INCONEL® alloy 617 throughout.

A turbine engine incorporating all of the elements and features discussed above in the present disclosure—including improvements in the fuel nozzle, the combustor and the transition component—will exhibit increased performance and durability over previous designs.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A gas turbine engine comprising;
   a compressor section;
   a plurality of fuel nozzles in a combustion section, said fuel nozzles providing fuel for combustion, where each of said fuel nozzles includes one or more fluid atomizing device with orifices configured to dispense liquid fuel and water in different atomized spray patterns and an integral heat shielding device;
   a plurality of combustors in the combustion section, each of said combustors receiving the fuel from one of the fuel nozzles and burning the fuel, where each of said combustors includes a combustor basket and a slip-joint cross-flame duct for connecting adjacent combustors;
   a plurality of transition components in the combustion section, each of said transition components receiving combustion gases from one of the combustors and delivering the combustion gases to a turbine section; and
   the turbine section including a plurality of rotor assemblies, where each rotor assembly includes a rotor disk and a plurality of turbine blades, wherein
   each combustor basket includes a basket liner having an input end receiving air and fuel output end through which a hot working gas exits the combustor basket, said combustor basket further including a double-wall exit cone positioned within the basket liner and coupled to the basket liner upstream of the basket exit, said double-wall exit cone including an inner cone wall and an outer cone wall defining an annular exit cone channel therebetween, each of the inner cone wall and the outer cone wall including an inner surface and an outer surface, where the outer surface of the inner cone wall and the inner surface of the outer cone wall face the annular exit cone channel, said combustor basket further including a splash plate mounted to the outer cone wall and extending parallel to the output end of the basket liner so as to define an annular splash plate channel therebetween, wherein the outer cone wall is attached to the basket so as to allow a cooling air to be split between the double-wall exit cone and the splash plate,
   a plurality of pairs of adjacent cooling fluid feed holes provided through the basket liner and circumferentially disposed around the output end of the basket liner so that one of the feed holes in each of the plurality of pairs of adjacent cooling fluid feed holes is in fluid communication annular exit cone channel and is prevented from being in fluid communication with the annular splash plate channel and an other feed hole in each of the plurality of pairs of adjacent cooling fluid feed soles is in fluid communication with the annular splash plate channel and is prevented from being in fluid communication with the annular exit cone channel.

2. The gas turbine engine of claim 1 wherein each of the combustors includes:
   at least one platefin cooling system formed from a platefin member positioned radially inward from an inner surface of the basket liner;
   at least one first rib section which extends between the platefin member and the combustor basket, thereby separating a first cooling circuit from a second cooling circuit,
   wherein the first cooling circuit is upstream from the second cooling circuit; wherein the first cooling circuit includes at least one first outlet positioned in the platefin member upstream from the at least one first rib section; and wherein the second cooling circuit includes at least one second outlet positioned downstream from the at least one first rib section.

3. The gas turbine engine of claim 1 wherein the slip-joint cross-flame duct comprises:

a first duct extending along a longitudinal axis and configured to be coupled to a first combustor of the plurality of combustors, the first duct comprising:
   a first outer sleeve having a first end configured to be coupled to the first combustor and a second end on an opposite end from the first end, and
   a first inner housing positioned within the first outer sleeve and having a first end adjacent the first combustor and a second end extending from the second end of the first outer sleeve;
a first cooling chamber positioned between an outer surface of the first inner housing and an inner surface of the first outer sleeve;
a second duct extending along the longitudinal axis and configured to be coupled to a second combustor of the plurality of combustors, wherein the second duct is configured to slidably receive the first duct, the second duct comprising:
   a second outer sleeve having a first end configured to be coupled to the second combustor and extending toward the first duct to slidably receive the second end of the first inner housing within a second end of the second outer sleeve, and
   a second inner housing positioned within the second outer sleeve and having a first end adjacent the second combustor and a second end extending toward the second end of the second outer sleeve; and
a second cooling chamber positioned between an outer surface of the second inner housing and an inner surface of the second outer sleeve.

4. The gas turbine engine of claim 1 wherein each of the transition components includes a first end mounted to one of the combustors and receiving the combustion gases, a second end opposite to the first end outputting the combustion gases, and a transition section between the first end and the second end having an outer wall defining a chamber therein through which the combustion gases flow, said outer wall having an inside surface and an outside surface, said transition section including a plurality of first effusion cooling holes extending through the outer wall and being angled in a direction so that an end of the effusion cooling holes at the inside surface is farther upstream relative to a flow of the combustion gases than an end of the effusion cooling holes at the outside surface.

5. The gas turbine engine of claim 1 wherein each of the transition components includes a transition cylinder at a first end mounted to one of the combustors and receiving the combustion gases, where the transition cylinder includes a plurality of circumferential or longitudinal slots on an outer surface, and a cylindrical sleeve fitted over the circumferential or longitudinal slots of the transition cylinder to form a plurality of circumferential or longitudinal cooling channels, and the cylindrical sleeve includes a cooling air inlet hole aligned with each of the slots to allow cooling air to enter and pass through the circumferential or longitudinal cooling channels.

* * * * *